United States Patent

You

(10) Patent No.: US 12,402,167 B2
(45) Date of Patent: Aug. 26, 2025

(54) COMMUNICATION METHOD AND SYSTEM, AND DEVICE

(71) Applicant: HUAWEI TECHNOLOGIES CO., LTD., Shenzhen (CN)

(72) Inventor: Chunhua You, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 334 days.

(21) Appl. No.: 17/849,166

(22) Filed: Jun. 24, 2022

(65) Prior Publication Data

US 2022/0322452 A1    Oct. 6, 2022

Related U.S. Application Data

(63) Continuation of application No. PCT/CN2019/128909, filed on Dec. 26, 2019.

(51) Int. Cl.
*H04W 74/0833* (2024.01)
*H04W 74/0808* (2024.01)

(52) U.S. Cl.
CPC ......... *H04W 74/0833* (2013.01); *H04W 74/0808* (2013.01)

(58) Field of Classification Search
None
See application file for complete search history.

(56) References Cited

U.S. PATENT DOCUMENTS

| 2017/0055297 | A1* | 2/2017 | Da ..................... H04J 13/0062 |
| 2018/0124612 | A1* | 5/2018 | Babaei ................. H04W 72/23 |
| 2020/0351940 | A1* | 11/2020 | Deogun ............... H04W 16/14 |
| 2021/0007132 | A1 | 1/2021 | Jiang |
| 2021/0084682 | A1 | 3/2021 | Kimba Dit Adamou et al. |
| 2021/0144760 | A1* | 5/2021 | Ozturk ................ H04W 74/002 |
| 2021/0153245 | A1* | 5/2021 | Tooher ................ H04W 74/006 |
| 2022/0248463 | A1* | 8/2022 | Wu ..................... H04W 74/004 |

FOREIGN PATENT DOCUMENTS

| CN | 102378380 A | 3/2012 |
| CN | 108243508 A | 7/2018 |
| CN | 110557763 A | 12/2019 |
| WO | 2019183881 A1 | 10/2019 |
| WO | 2019228298 A1 | 12/2019 |

OTHER PUBLICATIONS

Author Unknown, Handling UL LBT Failures in MAC, Doc. No. R2-1914882, pp. 1-4, Nov. 22 (Year: 2019).*

(Continued)

*Primary Examiner* — Christopher M Crutchfield
(74) *Attorney, Agent, or Firm* — HAUPTMAN HAM, LLP

(57) ABSTRACT

A communication method includes obtaining first information, and sending the first information to a network device. The first information includes information of a random access failure that occurs in response to a terminal device performing random access. The first information is useable to update at least one or more of a random access configuration, an uplink listen before talk (LBT) failure configuration, or a bandwidth part (BWP) configuration.

20 Claims, 5 Drawing Sheets

(56) References Cited

OTHER PUBLICATIONS

Author Unknown, Remaining issues on uplink LBT failure, Doc. No. R2-1914367, pp. 1-5, Nov. 18 (Year: 2019).*
Author Unknown, Report of offline-403—Remaining issues of consistent UL LBT failure, Doc No. R2-1916382, pp. 1-11, Nov. 22 (Year: 2019).*
Interdigital: "Handling UL LBT Failures in MAC", 3GPP Draft; R2-1914882,Nov. 7, 2019,XP051816826,total 4 pages.
Oppo: "UL BWP switching upon RACH for NR-U", 3GPP Draft; R2-1811066,Aug. 10, 2018,XP051520767,total 2 pages.
Mediatek Inc: "On consistent LBT failures", 3GPP Draft; R2-1913260,Oct. 3, 2019, XP051804153,total 5 pages.
Nokia et al: "Remaining details of 2-step RACH Procedure", 3GPP Draft; R1-1912558,Nov. 8, 2019, XP051820080, total 31 pages.
Extended European Search Report issued in corresponding European Application No. 19957080.5, dated Oct. 20, 2022, pp. 1-10.
Vivo, Remaining issues of uplink LBT failure. 3GPP TSG-RAN WG2 Meeting #107bis , Chongqing, China, Oct. 14, 18, 2019, R2-1912177, 4 pages.
3GPP TS 37.320 V15.0.0 (Jun. 2018), 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15), 27 pages.
Intel Corporation, Detecting and Handling of UL LBT failures. 3GPP TSG-RAN WG2 107bis, Chongqing, China, Oct. 14-18, 2019, R2-1912625, 5 pages.
3GPP TS 38.300 V15.7.0 (Sep. 2019), 3rd Generation Partnership Project; Technical Specification Group Radio Access Network; NR; NR and NG-RAN Overall Description; Stage 2(Release 15), 99 pages.
International Search Report issued in corresponding International Application No. PCT/CN2019/128909, dated Sep. 4, 2020, pp. 1-9.

\* cited by examiner

COMMUNICATION METHOD AND SYSTEM, AND DEVICE

CROSS-REFERENCE TO RELATED APPLICATIONS

This application is a continuation of International Application No. PCT/CN2019/128909, filed on Dec. 26, 2019, the disclosure of which is hereby incorporated by reference in its entirety.

TECHNICAL FIELD

This application relates to the field of communication technologies, and in particular, to a communication method and system, and a device.

BACKGROUND

Listen before talk (listen before talk, LBT) is a channel access process that needs to be performed by a device before data transmission. If the channel access process is completed, it is determined that the LBT succeeds and the data transmission can be performed. If the channel access process is not completed, it is determined that the LBT fails and the data transmission cannot be performed.

To improve data transmission efficiency, a consistent (consistent) uplink (uplink, UL) LBT failure (failure) detection mechanism is currently supported. A specific process is as follows: A terminal device uses a timer (timer) and a counter (counter) to detect whether a consistent UL LBT failure occurs. Each time it is determined that a UL LBT failure occurs, the counter is increased by 1, and the timer is restarted. If the counter reaches a maximum preset quantity, it is determined that the consistent UL LBT failure occurs. When the timer expires, the counter needs to be reset.

When the consistent UL LBT failure occurs in a primary cell (primary cell, PCell), the terminal device performs a bandwidth part (bandwidth part, BWP) switching process, to switch an active BWP from a current BWP to another BWP for random access, so that the consistent UL LBT failure is recovered. If the terminal device attempts to perform random access on all BWPs having physical random access channel (physical random access channel, PRACH) resources, but the random access all fails, a re-establishment process needs to be performed (that is, the access is performed in another cell).

It can be learned that a random access configuration or a BWP configuration directly affects a latency in consistent UL LBT failure recovery, and an uplink LBT failure configuration directly affects an occasion on which the consistent UL LBT failure occurs. Therefore, how to optimize these configurations to improve the data transmission efficiency is an urgent problem to be resolved currently.

SUMMARY

Embodiments of this application provide a communication method and system, and a device, to optimize a random access configuration, a BWP configuration, or an uplink LBT failure configuration, so that data transmission efficiency can be improved.

To achieve the foregoing objective, the following technical solutions are used in embodiments of this application.

According to a first aspect, a communication method is provided. A communication apparatus that performs the method may be a terminal device, or may be a module, for example, a chip or a chip system, used in the terminal device. The following provides descriptions by using an example in which an execution body is the terminal device. The terminal device obtains first information, where the first information is information about a random access failure that occurs when the terminal device performs random access. The terminal device sends the first information to a network device, where the first information is used to update or optimize one or more of the following: a random access configuration, an uplink listen before talk LBT failure configuration, or a bandwidth part BWP configuration. Based on this solution, in this embodiment of this application, the terminal device may report, to the network device, the information about the random access failure that occurs when the terminal device performs random access, so that the network device can update the one or more of the random access configuration, the uplink LBT failure configuration, or the BWP configuration based on the information about the random access failure that occurs when the terminal device performs random access. Therefore, the random access configuration, the uplink LBT failure configuration, or the BWP configuration can be optimized. Optimizing the random access configuration or the BWP configuration can reduce a latency in consistent UL LBT failure recovery. Optimizing the uplink LBT failure configuration can postpone an occurrence of a consistent UL LBT failure or avoid the occurrence of the consistent UL LBT failure. Data transmission efficiency can be improved by reducing the latency in the consistent UL LBT failure recovery, postponing the occurrence of the consistent UL LBT failure, or avoiding the occurrence of the consistent UL LBT failure. Therefore, based on the communication method provided in this embodiment of this application, the data transmission efficiency can be improved.

According to a second aspect, a communication method is provided. A communication apparatus that performs the method may be a network device, or may be a module, for example, a chip or a chip system, used in the network device. The following provides descriptions by using an example in which an execution body is the network device. The network device receives first information from a terminal device, where the first information is information about a random access failure that occurs when the terminal device performs random access. The network device updates or optimizes one or more of the following based on the first information: a random access configuration, an uplink listen before talk LBT failure configuration, or a bandwidth part BWP configuration. For technical effects of the second aspect, refer to the first aspect. Details are not described herein again.

With reference to the first aspect or the second aspect, in a possible implementation, the first information includes one or more of the following: BWP switching quantity information, identification information of at least one BWP, or random access statistics information of the at least one BWP. The BWP switching quantity information indicates a quantity of times of BWP switching that has been performed by the terminal device before consistent uplink LBT failure recovery is completed. The identification information of the at least one BWP indicates a BWP on which the terminal device has performed consistent uplink LBT failure recovery before the consistent uplink LBT failure recovery is completed. The random access statistics information of the at least one BWP indicates random access statistics information of the BWP on which the terminal device has performed consistent uplink LBT failure recovery before the consistent uplink LBT failure recovery is completed. Because the parameters such as the BWP switching quantity information, the identification information of the at least one BWP, or the random access statistics information of the at least one BWP may feed back reasonableness of the random access configuration, the uplink LBT failure configuration, or the bandwidth part BWP configuration, the network device can optimize the random access configuration, the uplink LBT failure configuration, or the bandwidth part BWP configuration based on the one or more of the BWP switching quantity information, the identification information of the at least one BWP, or the random access statistics information of the at least one BWP.

With reference to the first aspect or the second aspect, in a possible implementation, the random access statistics information of each of the at least one BWP includes one or more of the following: identification information of a synchronization signal block SSB and/or a channel state information-reference signal CSI-RS attempted by the terminal device on a corresponding BWP, frequency information of the SSB and/or the CSI-RS attempted by the terminal device on the corresponding BWP, a quantity of preambles attempted by the terminal device on the corresponding BWP, a quantity of preambles for the SSB and/or the CSI-RS attempted by the terminal device on the corresponding BWP, signal quality of the SSB and/or the CSI-RS attempted by the terminal device on the corresponding BWP, information indicating whether contention for preambles in 2-step random access or 4-step random access exists on the corresponding BWP, a quantity of preambles that are used in the 2-step random access and that are attempted by the terminal device on the corresponding BWP, a quantity of preambles that are used in the 4-step random access and that are attempted by the terminal device on the corresponding BWP, or information indicating whether fallback from the 2-step random access to the 4-step random access occurs on the corresponding BWP. Because the random access statistics information of the BWP is the random access statistics information of the BWP on which the terminal device has performed consistent uplink LBT failure recovery before the consistent uplink LBT failure recovery is completed, and may feed back the reasonableness of the random access configuration, the uplink LBT failure configuration, or the bandwidth part BWP configuration, the network device can optimize the random access configuration, the uplink LBT failure configuration, or the bandwidth part BWP configuration based on the random access statistics information of the BWP.

With reference to the first aspect or the second aspect, in a possible implementation, the random access configuration includes one or more of the following: a physical random access channel PRACH configuration of the preamble in the 2-step random access, a time-frequency resource configuration of a payload in the 2-step random access, indication information indicating whether the fallback from the 2-step random access to the 4-step random access is allowed, a PRACH configuration of the preamble in the 4-step random access, grouping of the preambles in the 2-step random access, grouping of the preambles in the 4-step random access, a backoff parameter value in the 2-step random access, a backoff parameter value in the 4-step random access, a transmit power control parameter in the 2-step random access, or a transmit power control parameter in the 4-step random access. Optimizing the random access configuration can reduce a latency in the consistent UL LBT failure recovery, to improve data transmission efficiency.

With reference to the first aspect or the second aspect, in a possible implementation, the PRACH configuration includes one or more of the following: a root sequence index, a zero correlation zone configuration, a high speed flag, a frequency offset, a configuration index, or a correspondence between an SSB and/or a CSI-RS and a random access resource. The root sequence index is used to configure a logical sequence number of a start root sequence of root sequences used by a cell, the SSB, or the CSI-RS. The zero correlation zone configuration indicates an index value of a cyclic shift configuration used when a PRACH preamble is generated. The high speed flag is used to determine whether the cell is a high-speed cell, whether the SSB is a high-speed SSB, or whether the CSI-RS is a high-speed CSI-RS. The frequency offset indicates an index of the $1^{st}$ resource block RB used by the terminal device to send a preamble. The configuration index indicates a time domain resource and a preamble format used by the terminal device to send the preamble. The correspondence between an SSB and a random access resource indicates a quantity of SSBs corresponding to one random access resource. The correspondence between a CSI-RS and a random access resource indicates a quantity of CSI-RSs corresponding to one random access resource.

With reference to the first aspect or the second aspect, in a possible implementation, the BWP configuration includes: whether the random access resource is configured for the terminal device on a BWP. Optimizing the BWP configuration can reduce the latency in the consistent UL LBT failure recovery, to improve the data transmission efficiency.

With reference to the first aspect or the second aspect, in a possible implementation, the uplink LBT failure configuration includes one or more of the following: an uplink LBT failure timer, an uplink LBT failure counter, or an energy detection threshold. Optimizing the uplink LBT failure configuration can postpone an occurrence of a consistent UL LBT failure or avoid the occurrence of the consistent UL LBT failure, to improve the data transmission efficiency.

According to a third aspect, a communication apparatus is provided, to implement the foregoing methods. The communication apparatus includes a corresponding module, unit, or means (means) for implementing the foregoing methods. The module, unit, or means may be implemented by hardware, software, or hardware executing corresponding software. The hardware or the software includes one or more modules or units corresponding to the foregoing functions.

According to a fourth aspect, a communication apparatus is provided. The communication apparatus includes a processor and an interface circuit. The interface circuit is configured to receive a signal from a communication apparatus other than the communication apparatus and transmit the signal to the processor, or send a signal from the processor to a communication apparatus other than the communication apparatus. The processor is configured to implement the method according to either of the foregoing aspects by using a logic circuit or by executing code instructions.

In a possible design, the communication apparatus further includes a memory. The memory is configured to store computer instructions. When the processor executes the instructions, the communication apparatus is enabled to perform the method according to either of the foregoing aspects.

According to a fifth aspect, a communication apparatus is provided. The communication apparatus a processor. The processor is configured to: be coupled to a memory, and read instructions in the memory, to perform the method according to either of the foregoing aspects according to the instructions.

In a possible design, the communication apparatus further includes the memory, and the memory is configured to store necessary program instructions and data. When the communication apparatus is a chip system, the communication apparatus may include a chip, or may include a chip and another discrete component.

According to a sixth aspect, a computer-readable storage medium is provided. The computer-readable storage medium stores instructions. When the instructions are executed by a communication apparatus, the communication apparatus is enabled to implement the method according to either of the foregoing aspects.

According to a seventh aspect, a computer program product including instructions is provided. When the instructions are executed by a communication apparatus, the communication apparatus is enabled to implement the method according to either of the foregoing aspects.

For technical effects brought by any one of the designs of the third aspect to the seventh aspect, refer to technical effects brought by different designs of the first aspect or the second aspect. Details are not described herein again.

According to an eighth aspect, a communication system is provided. The communication system includes the communication apparatus configured to implement the method according to the first aspect and the communication apparatus configured to perform the method according to the second aspect.

DESCRIPTION OF EMBODIMENTS

Figure 1:
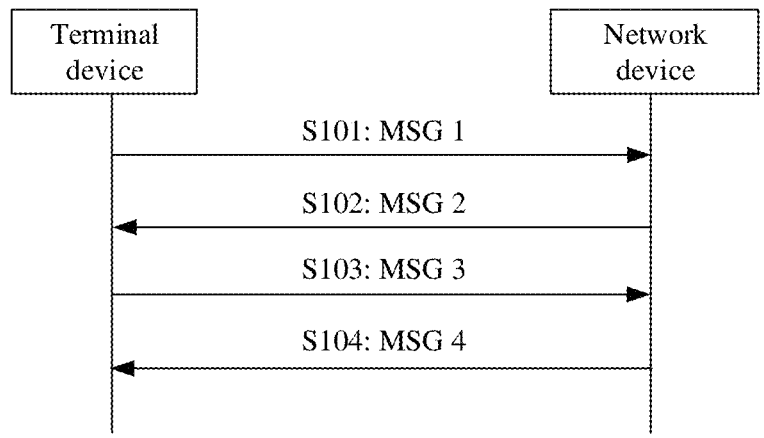
FIG. 1 is a schematic flowchart of a 4-step RACH according to an embodiment of this application.

For ease of understanding technical solutions in embodiments of this application, the following first briefly describes technologies or terms related to this application.

First, LBT.

A basis of wireless communication is a spectrum resource. Spectrum resources may be classified into two types based on types: a licensed spectrum (which may also be referred to as a non-shared spectrum) and an unlicensed spectrum (which may also be referred to as a shared spectrum). The licensed spectrum can be used only by a specific operator in a place, and the unlicensed spectrum can be used by any operator and is a shared spectrum resource. Embodiments of this application are mainly for the unlicensed spectrum.

In the unlicensed spectrum, because the unlicensed spectrum is the shared spectrum, there are many different air interface technologies, for example, wireless fidelity (wireless fidelity, Wi-Fi), licensed-assisted access (licensed-assisted access, LAA) using long term evolution (long term evolution, LTE), or a new LTE-based technology MuLTEfire. To ensure that different air interface technologies coexist on the unlicensed spectrum, a mechanism is required to avoid mutual interference. This mechanism is called the LBT.

As described in the background, the LBT is a channel access process that needs to be performed by a device before data transmission. If the channel access process is completed, it is determined that the LBT succeeds and the data transmission can be performed. If the channel access process is not completed, it is determined that the LBT fails and the data transmission cannot be performed.

Currently, there are two types of channel access processes. The first type of channel access process is a channel access process of energy detection based on fixed duration. Within the fixed duration, a device detects signal strength on an unlicensed spectrum resource. If the signal strength is greater than a preset threshold, the device considers that a channel is busy; otherwise, the device considers that a channel is idle. The second type of channel access process is a channel access process based on a fallback mechanism. The device randomly selects a value A from a contention window [a minimum value, a maximum value], and performs energy detection. If the device detects that reference signal received strength in at least A detection slots is less than or equal to the preset threshold, the device considers that a channel is idle; otherwise, the device considers that a channel is busy. The device determines that the channel access process is completed or the LBT succeeds, and may perform data transmission only when the device considers that the channel is idle before the data transmission; otherwise, the device determines that the channel access process is not completed or the LBT fails.

For the energy detection in the foregoing two types of channel access processes, the device needs to receive signals in all directions, and then measures these signals to obtain signal strength. Such detection based on all directions may also be referred to as a channel access process based on all directions. In another case, the device receives only signals in some directions, and then measures the signals in some directions to obtain signal strength in some directions. Such detection based on some directions may also be referred to as a channel access process based on some directions.

It should be noted that the channel access process based on all directions is usually mainly used in a low frequency, and the channel access process based on some directions is usually used in a high frequency because a path loss of the high frequency is large. To compensate for the path loss, directional transmission (beam-based transmission) is used. Different directions are independent of each other, and basically have no interference.

Second, a Random Access Process.

In an actual application process, a terminal device may initiate random access in a plurality of possible scenarios. For example, the plurality of possible scenarios may include at least one of the following scenarios: (1) The terminal device initiates initial access in a radio resource control (radio resource control, RRC) idle state. (2) After a radio link between the terminal device and a network device fails, when reestablishing an RRC connection to the network device, the terminal device initiates random access. (3) When the terminal device needs to establish uplink synchronization with a new cell, the terminal device initiates random access. (4) When the terminal device is in an RRC connected state and an uplink is out of synchronization, if uplink or downlink data arrives, the terminal device initiates random access. (5) When the terminal device is in the RRC connected state, but a dedicated resource for sending a scheduling request has not been configured for the terminal device on a physical uplink control channel (physical uplink control channel, PUCCH), the terminal device initiates random access. (6) When the scheduling request fails, the terminal device initiates random access. (7) When synchronizing a reconfiguration RRC request, the terminal device initiates random access. (8) When a state of the terminal device is switched from an RRC inactive state to the RRC connected state, the terminal device initiates random access. (9) When time alignment is established during an addition of a second cell, the terminal device initiates random access. (10) When requesting system information other than a master information block (master information block, MIB) and a system information block (system information block, SIB), the terminal device initiates random access. (11) The terminal device initiates random access when a beam failure is recovered. (12) The terminal device initiates random access when a consistent uplink LBT failure occurs.

The random access in this application may include 4-step random access (or referred to as a 4-step random access channel, which is referred to as a 4-step RACH for short below) or 2-step random access (or referred to as a 2-step random access channel, which is referred to as a 2-step RACH for short below). For ease of understanding, the following separately describes in detail processes of the 4-step RACH and the 2-step RACH.

FIG. 1 is a schematic flowchart of a 4-step RACH according to an embodiment of this application. The 4-step RACH is defined in detail in the existing technical specification (technical specification, TS) 38.300, and is only briefly described in this application. Refer to FIG. 1. The method may include the following steps.

S101: A terminal device sends a MSG 1 (or referred to as a Msg 1 or a msg 1) to a network device. Accordingly, the network device receives the MSG 1 from the terminal device.

The MSG 1 is for transmitting a random access preamble (or referred to as a random access preamble sequence, which is referred to as a preamble for short below, or may be referred to as a preamble sequence). In this embodiment of this application, the preamble and a time-frequency resource occupied for sending the preamble are referred to as PRACH resources.

Optionally, the network device may broadcast an available PRACH resource, and the terminal device may select one preamble, and send the preamble on a corresponding time-frequency resource. For example, the network device may broadcast the available PRACH resource by using system information.

S102: The network device sends a MSG 2 (or referred to as a Msg 2 or a msg 2) to the terminal device. Accordingly, the terminal device receives the MSG 2 from the network device.

The MSG 2 includes a time-frequency resource that is determined by the network device and that is used by the terminal device to send a payload (payload).

S103: The terminal device sends a MSG 3 (or referred to as a Msg 3 or a msg 3) to the network device. Accordingly, the network device receives the MSG 3 from the terminal device.

The MSG 3 is first scheduled for transmission in a random access process, and is for sending the payload (payload). For example, the MSG 3 may include an RRC connection request message, a tracking area update message, and the like.

It should be noted that, if different terminal devices select the same preamble in S101 and send the preamble on the same time-frequency resource, the different terminal devices send payloads on the same time-frequency resource. As a result, a resource use conflict occurs.

S104: The network device sends a MSG 4 (or referred to as a Msg 4 or a msg 4) to the terminal device. Accordingly, the terminal device receives the MSG 4 from the network device.

The MSG 4 indicates whether the terminal device successfully accesses the network device. If the terminal device does not receive the MSG 4 for the terminal device in a running period of a contention resolution timer, the terminal device performs step S101.

In the 4-step RACH shown in FIG. 1, the terminal device and the network device need to exchange signaling four times. Consequently, signaling overheads are high, and a communication latency is high.

Figure 2:
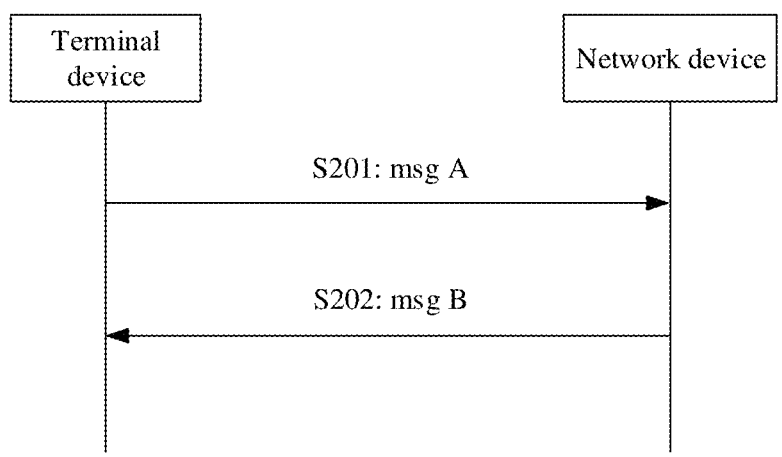
FIG. 2 is a schematic flowchart of a 2-step RACH according to an embodiment of this application.

FIG. 2 is a schematic flowchart of a 2-step RACH according to an embodiment of this application. Refer to FIG. 2. The method may include the following steps.

S201: A terminal device sends a msg A (or referred to as a Msg A or a MSG A) to a network device. Accordingly, the network device receives the msg A from the terminal device.

The msg A includes a preamble and a payload (for example, an RRC connection request message and a tracking area update message).

S202: The network device sends a msg B (or referred to as a Msg B or a MSG B) to the terminal device. Accordingly, the terminal device receives the msg B from the network device.

The msg B indicates whether the terminal device successfully accesses the network device.

It should be noted that the msg B includes a fallback (fallback) random access response (random access response, RAR) and a success (success) RAR. The fallback RAR is sent when the network device successfully decodes the preamble but fails to decode the payload. The success RAR is sent when the network device successfully decodes the preamble and the payload.

When the terminal device receives the success RAR, it is considered that random access is completed. When the terminal device receives the fallback RAR, the terminal device transmits the payload (which is similar to a msg 3) again. If the network device successfully decodes the payload, the network device sends a contention resolution message (which is similar to a msg 4) to the terminal device. If the terminal device does not receive the contention resolution message, S201 is performed.

If the terminal does not receive the fallback RAR or the success RAR for the terminal, step S201 is performed.

In the 2-step RACH shown in FIG. 2, the terminal device and the network device need to exchange signaling twice. Compared with a case in a 4-step RACH, signaling overheads are reduced, and a communication latency is reduced.

The following describes technical solutions in embodiments of this application with reference to the accompanying drawings in embodiments of this application. In the descriptions of this application, unless otherwise specified, "l" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A or B may be singular or plural. In addition, in the descriptions of this application, "a plurality of" means two or more unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the words such as "first" and "second" do not limit a quantity or an execution sequence, and the words such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments in this application should not be explained as being more preferable or having more advantages than another embodiment or design scheme. Exactly, use of the word such as "example" or "for example" is intended to present a relative concept in a specific manner for ease of understanding.

Embodiments of this application are applicable to an LTE system or a new radio (new radio, NR) system, or are applicable to another future-oriented new system or the like. This is not specifically limited in embodiments of this application. In addition, the terms "system" and "network" are interchangeable.

Figure 3:
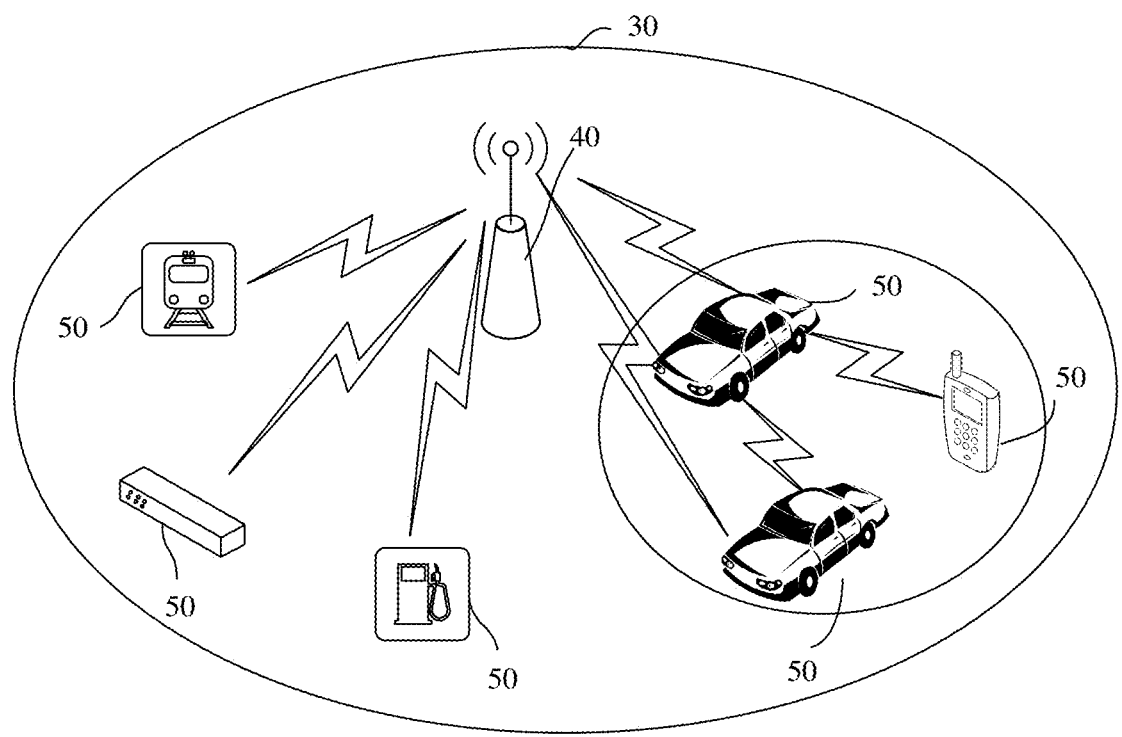
FIG. 3 is a schematic diagram of an architecture of a communication system according to an embodiment of this application.

FIG. 3 shows a communication system 30 according to an embodiment of this application. The communication system 30 includes a network device 40 and one or more terminal devices 50 connected to the network device 40. The terminal device 50 is connected to the network device 40 in a wireless manner. Optionally, different terminal devices 50 may communicate with each other. The terminal device 50 may be located at a fixed position, or may be mobile.

It should be noted that FIG. 3 is merely a schematic diagram. The communication system 30 may further include another network device, for example, one or more of a core network device, a wireless relay device, and a wireless backhaul device though they are not shown in FIG. 3. This is not specifically limited herein. The network device may be connected to the core network device in a wireless or wired manner. The core network device and the network device 40 may be different independent physical devices, or functions of the core network device and logical functions of the network device 40 may be integrated into a same physical device, or a part of functions of the core network device and a part of functions of the network device 40 may be integrated into one physical device. This is not specifically limited in this embodiment of this application.

For example, the network device 40 shown in FIG. 3 interacts with any terminal device 50. In this embodiment of this application, the terminal device 50 obtains first information, and sends the first information to the network device 40. The first information is information about a random access failure that occurs when the terminal device 50 performs random access. The first information is used to update or optimize one or more of the following: a random access configuration, an uplink LBT failure configuration, or a bandwidth part (bandwidth part, BWP) configuration. The network device 40 receives the first information from the terminal device, and updates or optimizes the one or more of the following based on the first information: the random access configuration, the uplink LBT failure configuration, or the BWP configuration. Specific implementation of the solution is to be described in subsequent method embodiments. Details are not described herein. Based on this solution, in this embodiment of this application, the terminal device may report, to the network device, the information about the random access failure that occurs when the terminal device performs random access, so that the network device can update the one or more of the random access configuration, the uplink LBT failure configuration, or the BWP configuration based on the information about the random access failure that occurs when the terminal device performs random access. Therefore, the random access configuration, the uplink LBT failure configuration, or the BWP configuration can be optimized. Optimizing the random access configuration or the BWP configuration can reduce a latency in consistent UL LBT failure recovery. Optimizing the uplink LBT failure configuration can postpone an occurrence of a consistent UL LBT failure or avoid the occurrence of the consistent UL LBT failure. Data transmission efficiency can be improved by reducing the latency in the consistent UL LBT failure recovery, postponing the occurrence of the consistent UL LBT failure, or avoiding the occurrence of the consistent UL LBT failure. Therefore, based on the communication system provided in this embodiment of this application, the data transmission efficiency can be improved.

Optionally, the network device 40 in this embodiment of this application is a device connecting the terminal device 50 to a wireless network. The network device 40 may be a base station (base station), an evolved NodeB (evolved NodeB, eNodeB), a transmission reception point (transmission reception point, TRP), a next generation base station (next generation NodeB, gNB) in a 5G mobile communication system, a base station in a future mobile communication system, an access node in a wireless fidelity (wireless-fidelity, Wi-Fi) system, or the like; or may be a module or unit that completes a part of functions of the base station, for example, may be a centralized unit (centralized unit, CU), or may be a distributed unit (distributed unit, DU). A specific technology and a specific device form that are used by the network device are not limited in embodiments of this application. In this application, unless otherwise specified, the network device is a radio access network device.

Optionally, the terminal device 50 in this embodiment of this application may be a device configured to implement a wireless communication function, for example, a terminal or a chip that may be used in the terminal. The terminal may also be referred to as user equipment (user equipment, UE), a mobile station, a mobile terminal, or the like. The terminal may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form that are used by the terminal device are not limited in embodiments of this application.

Optionally, the network device 40 and the terminal device 50 in this embodiment of this application may be deployed on land, including indoor, outdoor, handheld, or vehicle-mounted devices; may be deployed on the water; or may be deployed on airplanes, balloons and satellites in the air. Application scenarios of the network device 40 and the terminal device 50 are not limited in embodiments of this application.

Optionally, the network device 40 and the terminal device 50 in this embodiment of this application may communicate with each other by using a licensed spectrum, may communicate with each other by using an unlicensed spectrum, or may communicate with each other by using both a licensed spectrum and an unlicensed spectrum. The network device 40 and the terminal device 50 may communicate with each other by using a spectrum below 6 gigahertz (gigahertz, GHz), may communicate with each other by using a spectrum above 6 GHz, or may communicate with each other by using both a spectrum below 6 GHz and a spectrum above 6 GHz. A spectrum resource used between the network device 40 and the terminal device 50 is not limited in embodiments of this application.

Optionally, the network device 40 and the terminal device 50 in this embodiment of this application may also be referred to as communication apparatuses, and each may be a general-purpose device or a dedicated device. This is not specifically limited in embodiments of this application.

Figure 4:
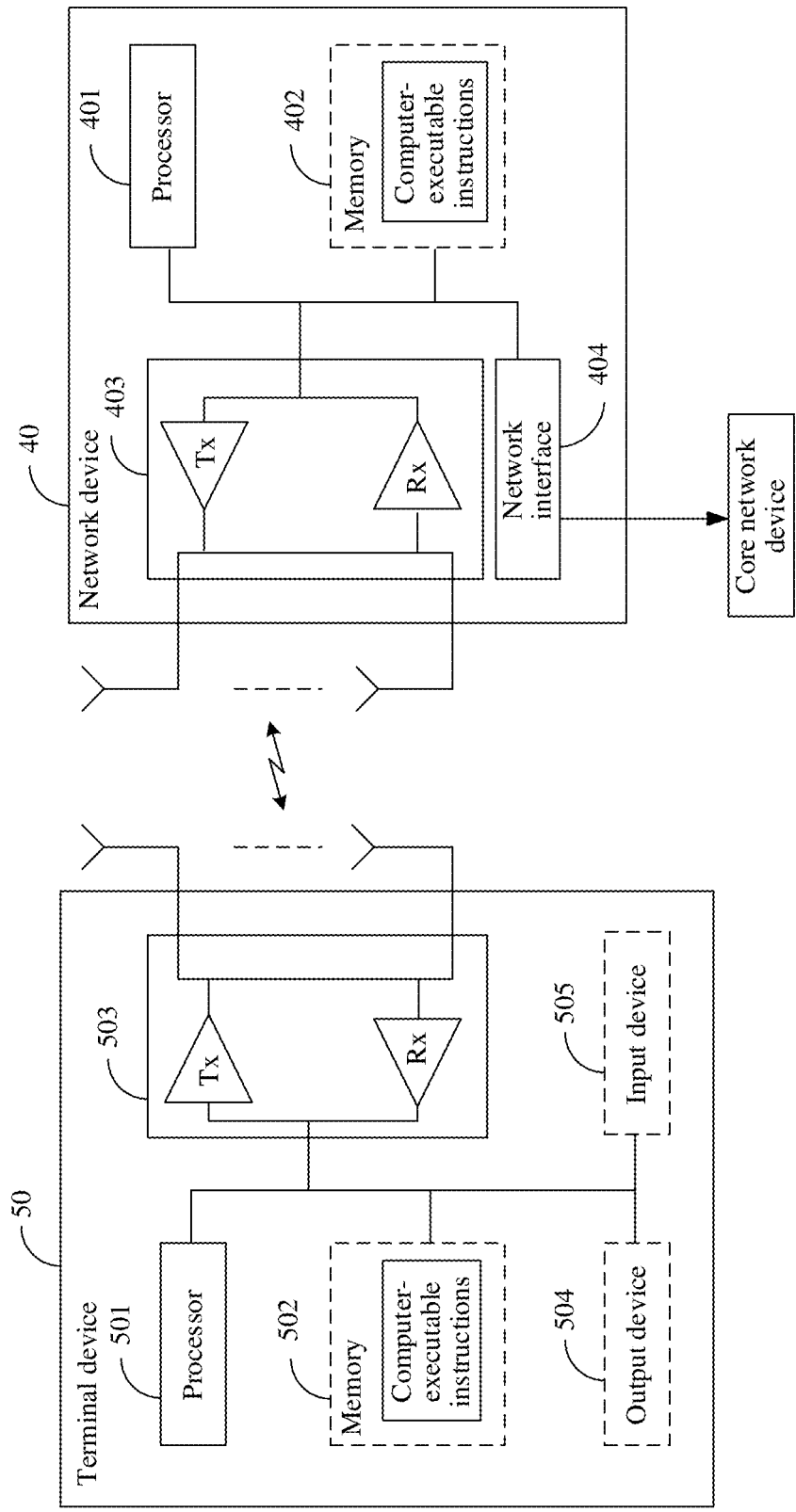
FIG. 4 is a schematic diagram of structures of a terminal device and a network device according to an embodiment of this application.

Optionally, FIG. 4 is a schematic diagram of structures of a network device 40 and a terminal device 50 according to an embodiment of this application.

The terminal device 50 includes at least one processor 501 and at least one transceiver 503. Optionally, the terminal device 50 may further include at least one memory 502, at least one output device 504, or at least one input device 505.

The processor 501, the memory 502, and the transceiver 503 are connected through a communication line. The communication line may include a path for transmitting information between the foregoing components.

The processor 501 may be a general-purpose central processing unit (central processing unit, CPU), another general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The general-purpose processor may be a microprocessor or any conventional processor. During specific implementation, in an embodiment, the processor 501 may also include a plurality of CPUs, and the processor 501 may be a single-core processor or a multi-core processor. The processor herein may be one or more devices, circuits or processing cores configured to process data.

The memory 502 may be an apparatus having a storage function. For example, the memory 502 may be a read-only memory (read-only memory, ROM), another type of static storage device that can store static information and instructions, a random access memory (random access memory, RAM), or another type of dynamic storage device that can store information and instructions; or may be a programmable read-only memory (programmable ROM, PROM), an erasable programmable read-only memory (erasable PROM, EPROM), an electrically erasable programmable read-only memory (electrically erasable programmable read-only memory, EEPROM), a compact disc read-only memory (compact disc read-only memory, CD-ROM) or another optical disk storage, an optical disc storage (including a compact disc, a laser disc, an optical disc, a digital versatile disc, a Blu-ray disc, or the like), a disk storage medium or another disk storage device, or any other medium that can be used to carry or store expected program code in a form of instructions or a data structure and that can be accessed by a computer, but is not limited herein. The memory 502 may exist independently, and is connected to the processor 501 through the communication line. The memory 502 and the processor 501 may be integrated together.

The memory 502 is configured to store computer-executable instructions for executing the solutions of this application, and the processor 501 controls the execution. Specifically, the processor 501 is configured to execute the computer-executable instructions stored in the memory 502, to implement the communication method in embodiments of this application.

Alternatively, optionally, in this embodiment of this application, the processor 501 may perform processing-related functions in communication method provided in the following embodiments of this application, and the transceiver 503 is responsible for communication with another device or a communication network. This is not specifically limited in this embodiment of this application.

Optionally, the computer-executable instructions in this embodiment of this application may also be referred to as application program code or computer program code. This is not specifically limited in this embodiment of this application.

The transceiver 503 may use any apparatus such as a transceiver, and is configured to communicate with another device or a communications network such as an Ethernet, a radio access network (radio access network, RAN), or a wireless local area network (wireless local area network, WLAN). The transceiver 503 includes a transmitter (transmitter, Tx) and a receiver (receiver, Rx).

The output device 504 communicates with the processor 501, and may display information in a plurality of manners. For example, the output device 504 may be a liquid crystal display (liquid crystal display, LCD), a light emitting diode (light emitting diode, LED) display device, a cathode ray tube (cathode ray tube, CRT) display device, or a projector (projector).

The input device 505 communicates with the processor 501, and may accept user input in a plurality of manners. For example, the input device 505 may be a mouse, a keyboard, a touchscreen device, or a sensing device.

The network device 40 includes at least one processor 401, at least one transceiver 403, and at least one network interface 404. Optionally, the network device 40 may further include at least one memory 402. The processor 401, the memory 402, the transceiver 403, and the network interface 404 are connected through the communication line. The network interface 404 is configured to connect to a core network device through a link (for example, an Si interface), or connect to a network interface of another network device through a wired or wireless link (for example, an X2 interface) (not shown in the FIG. 4). This is not specifically limited in this embodiment of this application. In addition, for related descriptions about the processor 401, the memory 402, and the transceiver 403, refer to the descriptions about the processor 501, the memory 502, and the transceiver 503 in the terminal device 50. Details are not described again herein.

Figure 5:
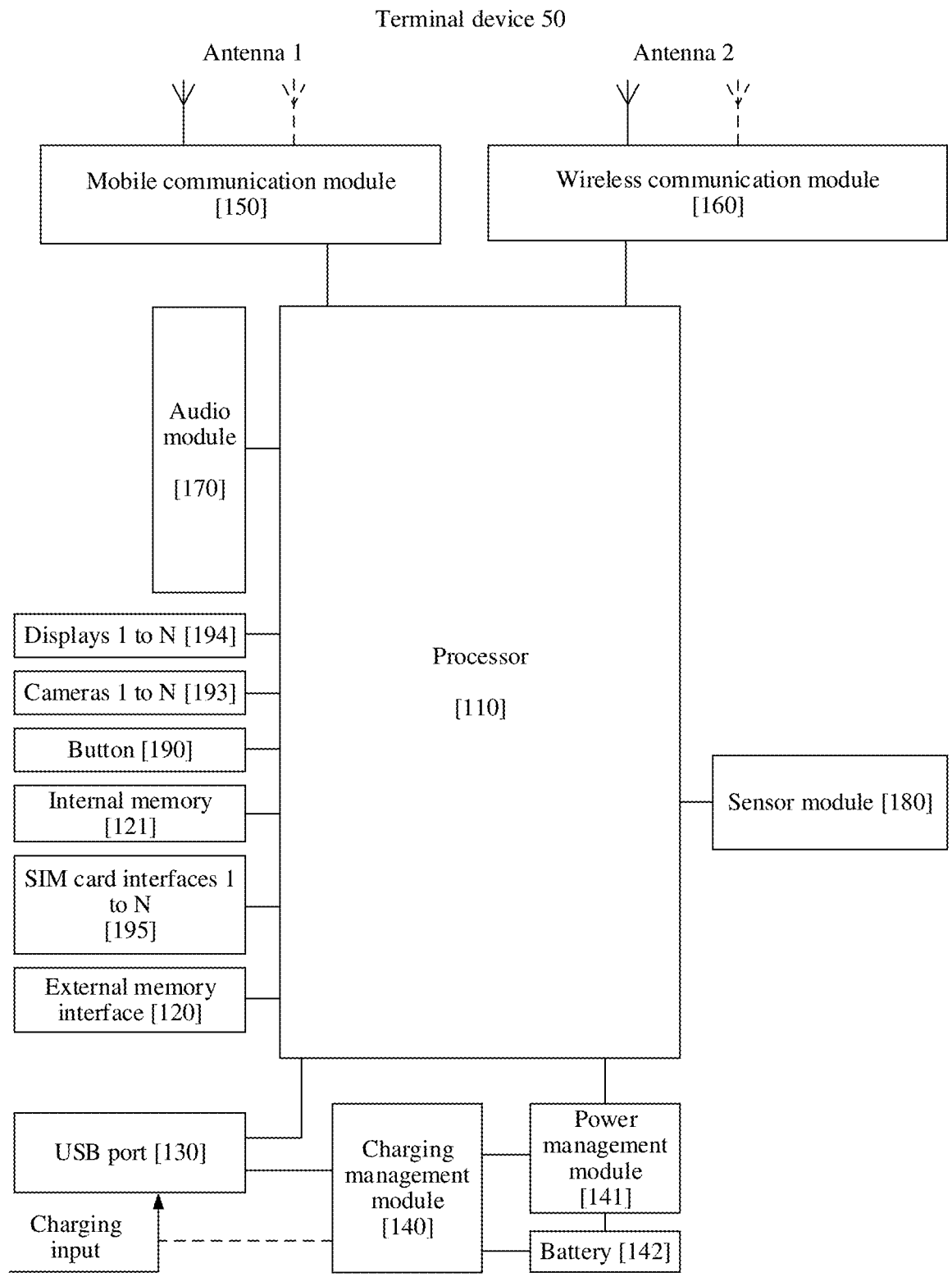
FIG. 5 is a schematic diagram of another structure of a terminal device according to an embodiment of this application.

With reference to the schematic diagram of the structure of the terminal device 50 shown in FIG. 4, for example, FIG. 5 shows a specific form of the structure of the terminal device 50 according to an embodiment of this application.

In some embodiments, a function of the processor 501 in FIG. 4 may be implemented by a processor 110 in FIG. 5.

In some embodiments, a function of the transceiver 503 in FIG. 4 may be implemented by using an antenna 1, an antenna 2, a mobile communication module 150, a wireless communication module 160, or the like in FIG. 5. The mobile communication module 150 may provide a solution that is applied to the terminal device 50 and that includes a wireless communication technology such as LTE, NR, or future mobile communication. The wireless communication module 160 may provide a solution that is applied to the terminal device 50 and that includes a wireless communication technology such as WLAN (for example, a Wi-Fi network), Bluetooth (Bluetooth, BT), a global navigation satellite system (global navigation satellite system, GNSS), frequency modulation (frequency modulation, FM), near field communication (near field communication, NFC), and infrared. In some embodiments, the antenna 1 of the terminal device 50 is coupled to the mobile communication module 150, and the antenna 2 is coupled to the wireless communication module 160, so that the terminal device 50 can communicate with a network and another device by using a wireless communication technology.

In some embodiments, a function of the memory 502 in FIG. 4 may be implemented by using an internal memory 121 in FIG. 5, an external memory connected to an external memory interface 120, or the like.

In some embodiments, a function of the output device 504 in FIG. 4 may be implemented by using a display 194 in FIG. 5.

In some embodiments, a function of the input device 505 in FIG. 4 may be implemented by using a mouse, a keyboard, a touchscreen device, or a sensor module 180 in FIG. 5.

In some embodiments, as shown in FIG. 5, the terminal device 50 may further include one or more of an audio module 170, a camera 193, a button 190, a SIM card interface 195, a USB interface 130, a charging management module 140, a power management module 141, and a battery 142.

It may be understood that the structure shown in FIG. 5 does not constitute any specific limitation on the terminal device 50. For example, in some other embodiments of this application, the terminal device 50 may include more or fewer components than those shown in the figure, some components may be combined, some components may be split, or the components may be differently arranged. The components shown in the figure may be implemented by using hardware, software, or a combination of software and hardware.

With reference to FIG. 1 to FIG. 5, the following describes, by using an example in which the network device 40 and any terminal device 50 shown in FIG. 3 interact with each other, the communication method provided in embodiments of this application.

It should be noted that names of messages between network elements, names of parameters in the messages, or the like in the following embodiments of this application are merely examples, and there may be other names during specific implementation. This is not specifically limited in embodiments of this application.

It should be noted that the following several embodiments may be independent or may be combined with each other, and same or similar content is not described repeatedly in different embodiments.

Figure 6:
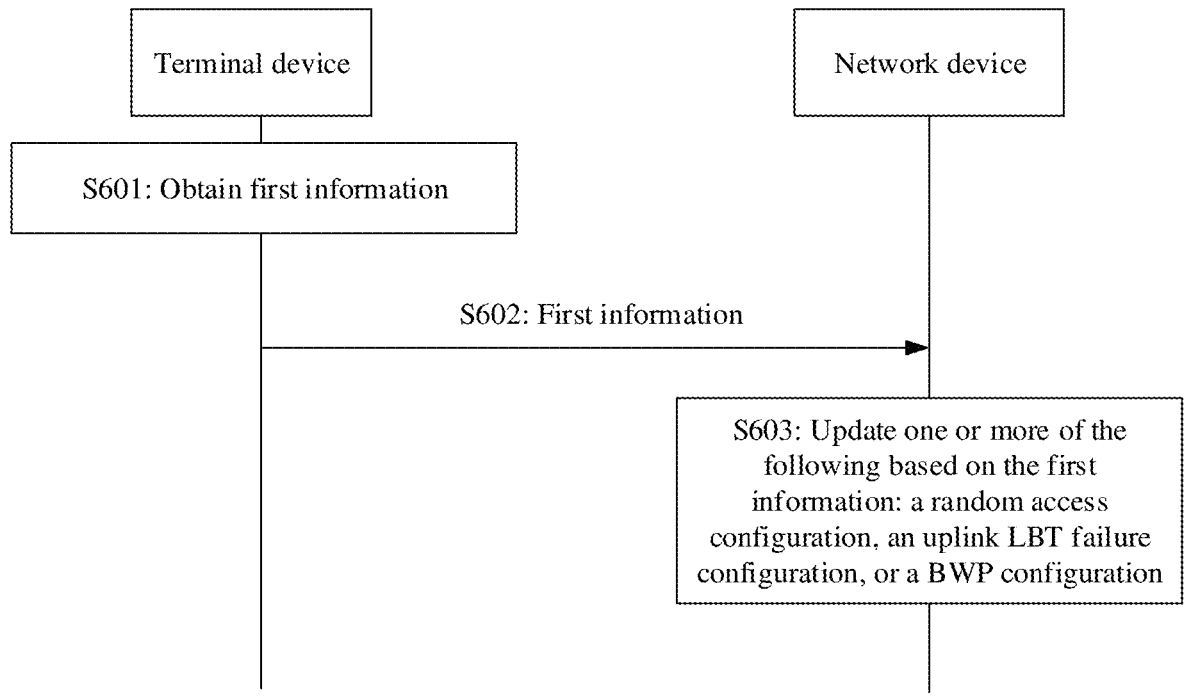
FIG. 6 is a schematic flowchart of a communication method according to an embodiment of this application.

FIG. 6 shows a communication method according to an embodiment of this application. The communication method includes steps S601 to S603.

S601: A terminal device obtains first information, where the first information is information about a random access failure that occurs when the terminal device performs random access.

S602: The terminal device sends the first information to a network device. Accordingly, the network device receives the first information from the terminal device.

S603: The network device updates one or more of the following based on the first information: a random access configuration, an uplink LBT failure configuration, or a BWP configuration.

In the foregoing steps S601 to S603:

Optionally, in this embodiment of this application, the random access configuration includes one or more of the following:

(1) PRACH configuration (PRACH configuration) of a preamble in 2-step random access The PRACH configuration of the preamble in the 2-step random access includes the preamble and/or a time-frequency resource for transmitting the preamble in the 2-step random access.

(2) PRACH configuration of a preamble in 4-step random access

The PRACH configuration of the preamble in the 4-step random access includes the preamble and/or a time-frequency resource for transmitting the preamble in the 4-step random access.

Optionally, in this embodiment of this application, the PRACH configurations in (1) and (2) each include one or more of the following:

1. Root Sequence Index

The root sequence index is used to configure a logical sequence number of a start root sequence of root sequences used by a cell, a synchronization signal block (synchronization signal and physical paging channel block, SSB), or a channel state information-reference signal (channel state information-reference signal, CSI-RS). An available preamble set corresponding to the cell, the SSB, or the CSI-RS is generated by performing cyclic shift on one or more root Zadoff-Chu sequences (ZC sequences). The logical sequence number of the start root sequence of the root sequences used by the cell, the SSB, or the CSI-RS is configured by using the parameter, namely, the root sequence index. After a value of the root sequence index is determined, the root sequences used by the cell, the SSB, or the CSI-RS are determined. When values of root sequence indexes of two cells, SSBs, or CSI-RSs are different, the two cells, SSBs, or CSI-RSs use different root sequences, and therefore preambles available to the two cells, SSBs, or CSI-RSs are different. For example, if a value of a root sequence index of a cell 1, an SSB 1, or a CSI-RS 1 is 1, and a value of a root sequence index of a cell 2, an SSB 2, or a CSI-RS 2 is 2, a ZC sequence for generating a preamble in the cell 1, the SSB 1, or the CSI-RS 1 is a ZC sequence corresponding to a root sequence index whose value is 1 in a root sequence index comparison table, and a ZC sequence for generating a preamble in the cell 2, the SSB 2, or the CSI-RS 2 is a ZC sequence corresponding to a root sequence index whose value is 2 in the root sequence index comparison table.

2. Zero Correlation Zone Configuration

The zero correlation zone configuration indicates an index value of a cyclic shift configuration used when a PRACH preamble is generated. After a value of the zero correlation zone configuration is determined, the cyclic shift used when the preamble is generated is determined, and therefore a preamble available to the cell, the SSB, or the CSI-RS is determined. When preambles are generated in two cells, SSBs, or CSI-RSs by using a same root sequence, if different zero correlation zone configurations are used, preambles available to the two cells, SSBs, or CSI-RSs are different.

3. High Speed Flag

The high speed flag is used to determine whether the cell is a high-speed cell, whether the SSB is a high-speed SSB, or whether the CSI-RS is a high-speed CSI-RS.

A root sequence used when a preamble is generated in the high-speed cell, SSB, or CSI-RS is different from a root sequence used when a preamble is generated in a non-high-speed cell, SSB, or CSI-RS. For example, if a cell 1 is a high-speed cell, and a cell 2 is a non-high-speed cell, root sequences used when preambles are generated in the two cells are different, and therefore preambles available to the two cells are different. Alternatively, if an SSB 1 is a high-speed SSB, and an SSB 2 is a non-high-speed SSB, root sequences used when preambles are generated in the two SSBs are different, and therefore preambles available to the two SSBs are different. Alternatively, if a CSI-RS 1 is a high-speed CSI-RS, and a CSI-RS 2 is a non-high-speed CSI-RS, root sequences used when preambles are generated in the two CSI-RSs are different, and therefore preambles available to the two CSI-RSs are different.

4. Frequency Offset

The frequency offset indicates an index of the $1^{st}$ resource block (resource block, RB) used by the terminal device to send a preamble. For example, if a frequency offset of a cell 1, an SSB 1, or a CSI-RS 1 is 1, and a frequency offset of a cell 2, an SSB 2, or a CSI-RS 2 is 2, a start RB for transmitting the preamble in the cell 1, the SSB 1, or the CSI-RS 1 is the $1^{st}$ RB, and an RB for transmitting the preamble in the cell 2, the SSB 2, or the CSI-RS 2 is the $2^{nd}$ RB.

5. Configuration Index

The configuration index indicates a time domain resource and a preamble format used by the terminal device to send the preamble. For example, if a configuration index of a cell 1, an SSB 1, or a CSI-RS 1 is 1, and a configuration index of a cell 2, an SSB 2, or a CSI-RS 2 is 2, a time-frequency resource for transmitting the preamble in the cell 1, the SSB 1, or the CSI-RS 1 is a time-frequency resource corresponding to a configuration index whose value is 1 in a random access configuration index comparison table, and a time-frequency resource for transmitting the preamble in the cell 2, the SSB 2, or the CSI-RS 2 is a time-frequency resource corresponding to a configuration index whose value is 2 in the random access configuration index comparison table. When the two cells, SSBs, or CSI-RSs use different configuration indexes, time-frequency resources used by the two cells, SSBs, or CSI-RSs to transmit preambles are different.

6. Correspondence Between an SSB and a Random Access Resource

The correspondence between an SSB and a random access resource indicates a quantity of SSBs corresponding to one random access resource.

7. Correspondence Between a CSI-RS and a Random Access Resource

The correspondence between a CSI-RS and a random access resource indicates a quantity of CSI-RSs corresponding to one random access resource.

(3) Time-frequency resource configuration of a payload in the 2-step random access (4) Indication information indicating whether fallback from the 2-step random access to the 4-step random access is allowed (5) Grouping of preambles in the 2-step random access (RA preamble group)

(6) Grouping of preambles in the 4-step random access (7) Backoff parameter value in the 2-step random access (RA backoff parameter value)

(8) Backoff parameter value in the 4-step random access (9) Transmit power control parameter in the 2-step random access (RA transmit power control parameter)

(10) Transmit power control parameter in the 4-step random access

Optionally, in this embodiment of this application, the BWP configuration includes: whether the random access resource is configured for the terminal device on a BWP.

Optionally, in this embodiment of this application, the uplink LBT failure configuration is used to monitor a consistent UL LBT failure, and includes one or more of the following parameters: an uplink LBT failure timer, an uplink LBT failure counter, or an energy detection threshold. For example, the terminal device uses a timer (for example, the uplink LBT failure timer) and a counter (for example, the uplink LBT failure counter) to detect whether the consistent UL LBT failure occurs. Each time it is determined that a UL LBT failure occurs, the counter is increased by 1, and the timer is restarted. If the counter reaches a maximum preset quantity, it is determined that the consistent UL LBT failure occurs. When the timer expires, it indicates that no data is scheduled or UL LBT succeeds for one or more times. Therefore, the counter needs to be reset. The counter is used to measure a quantity of consistent UL LBT failures.

Optionally, in this embodiment of this application, the first information includes one or more of the following: BWP switching quantity information, identification information of at least one BWP, or random access statistics information of the at least one BWP.

In consistent uplink LBT failure recovery, the terminal device may switch the BWP to recover the consistent uplink LBT failure. The BWP switching quantity information indicates a quantity of times of BWP switching that has been performed by the terminal device before the consistent uplink LBT failure recovery is completed. When the random access succeeds, the terminal device completes the consistent uplink LBT failure recovery. For example, it is assumed that a currently active BWP is a BWP 1, uplink transmission can be performed only on the active BWP, and the terminal device determines that the consistent uplink LBT failure occurs on the BWP 1. In the consistent uplink LBT failure recovery, the active BWP of the terminal device is switched from the BWP 1 to a BWP 2, and the terminal device attempts to perform random access on the BWP 2, but fails to perform random access on the BWP 2. The active BWP of the terminal device is switched from the BWP 2 to a BWP 3, and the terminal device attempts to perform random access on the BWP 3, but fails to perform random access on the BWP 3. The active BWP of the terminal device is switched from the BWP 3 to a BWP 4, and the terminal device attempts to perform random access on the BWP 4, and succeeds in performing random access on the BWP 4. In this case, the BWP switching quantity information may be considered as 3. In other words, the terminal device has performed BWP switching three times before the consistent uplink LBT failure recovery is completed.

In this embodiment of this application, if the terminal device performs BWP switching for an excessively large quantity of times, it indicates that the random access configuration may be inappropriate, and random access resources may not need to be configured for some BWPs, or random access configurations on some BWPs need to be optimized.

The identification information of the at least one BWP indicates a BWP on which the terminal device has performed consistent uplink LBT failure recovery before the consistent uplink LBT failure recovery is completed. For example, it is assumed that a currently active BWP is a BWP 1, uplink transmission can be performed only on the active BWP, and the terminal device determines that the consistent uplink LBT failure occurs on the BWP 1. In the consistent uplink LBT failure recovery, the active BWP of the terminal device is switched from the BWP 1 to a BWP 2, and the terminal device attempts to perform random access on the BWP 2, but fails to perform random access on the BWP 2. The active BWP of the terminal device is switched from the BWP 2 to a BWP 3, and the terminal device attempts to perform random access on the BWP 3, but fails to perform random access on the BWP 3. The active BWP of the terminal device is switched from the BWP 3 to a BWP 4, and the terminal device attempts to perform random access on the BWP 4, and succeeds in performing random access on the BWP 4. In this case, the identification information of the at least one BWP includes identification information of the BWP 2, identification information of the BWP 3, and identification information of the BWP 4. In other words, BWPs on which the terminal device has performed consistent uplink LBT failure recovery before the consistent uplink LBT failure recovery is completed include the BWP 2, the BWP 3, and the BWP 4.

The consistent uplink LBT failure recovery in this embodiment of this application may be a 4-step random access process, a 2-step random access process, or a scheduling request process. This is not specifically limited in this embodiment of this application. If excessive identification information of the BWP is carried, it indicates that the random access configuration or a scheduling request configuration may be inappropriate, and random access resources (or scheduling request resources) may not need to be configured for some BWPs, or random access configurations (or scheduling request configurations) on some BWPs need to be optimized.

The random access statistics information of the at least one BWP indicates random access statistics information of the BWP on which the terminal device has performed consistent uplink LBT failure recovery before the consistent uplink LBT failure recovery is completed. The at least one BWP herein is a BWP on which the terminal device has performed consistent uplink LBT failure recovery before the consistent uplink LBT failure recovery is completed. For a related example, refer to the description part of the identification information of the at least one BWP. Details are not described herein again.

Optionally, in this embodiment of this application, the random access statistics information of each of the at least one BWP includes one or more of the following:

a. Identification Information of an SSB and/or a CSI-RS Attempted by the Terminal Device on a Corresponding BWP In this embodiment of this application, the SSB attempted by the terminal device on the corresponding BWP is an SSB used by the terminal device to perform random access on the corresponding BWP before the consistent uplink LBT failure recovery is completed. Specifically, the terminal device sends the preamble to the network device by using a random access resource corresponding to the SSB. The CSI-RS attempted by the terminal device on the corresponding BWP is a CSI-RS used by the terminal device to perform random access on the corresponding BWP before the consistent uplink LBT failure recovery is completed. Specifically, the terminal device sends the preamble to the network device by using a random access resource corresponding to the CSI-RS.

There may be one or more pieces of identification information of an SSB and/or a CSI-RS attempted by the terminal device on a BWP. This is not specifically limited in this embodiment of this application.

For example, it is assumed that a currently active BWP is a BWP 1, uplink transmission can be performed only on the active BWP, and the terminal device determines that the consistent uplink LBT failure occurs on the BWP 1. In the consistent uplink LBT failure recovery, the active BWP of the terminal device is switched from the BWP 1 to a BWP 2, and the terminal device attempts to perform random access on the BWP 2, but fails to perform random access on the BWP 2. The active BWP of the terminal device is switched from the BWP 2 to a BWP 3, and the terminal device attempts to perform random access on the BWP 3, but fails to perform random access on the BWP 3. The active BWP of the terminal device is switched from the BWP 3 to a BWP 4, and the terminal device attempts to perform random access on the BWP 4, and succeeds in performing random access on the BWP 4. It is assumed that the terminal device performs random access on the BWP 2 by using an SSB 1 and an SSB 2, the terminal device performs random access on the BWP 3 by using the SSB 1, and the terminal device fails to perform random access on the BWP 4 by using the SSB 1, but succeeds in performing random access on the BWP 4 by using the SSB 2. In this case, the identification information of the SSB attempted by the terminal device on the corresponding BWP includes identification information of the BWP 2: identification information of the SSB 1 and identification information of the SSB 2; identification information of the BWP 3: the identification information of the SSB 1; and identification information of the BWP 4: the identification information of the SSB 1. It should be noted that a number of the identification information of the SSB is independently numbered for each BWP, and there is the SSB 1 on all BWPs. The network device can distinguish, only based on the reported identification information of the BWP, a specific BWP corresponding to one SSB 1. This is uniformly described herein, and details are not described below again.

Alternatively, for example, it is assumed that a currently active BWP is a BWP 1, uplink transmission can be performed only on the active BWP, and the terminal device determines that the consistent uplink LBT failure occurs on the BWP 1. In the consistent uplink LBT failure recovery, the active BWP of the terminal device is switched from the BWP 1 to a BWP 2, and the terminal device attempts to perform random access on the BWP 2, but fails to perform random access on the BWP 2. The active BWP of the terminal device is switched from the BWP 2 to a BWP 3, and the terminal device attempts to perform random access on the BWP 3, but fails to perform random access on the BWP 3. The active BWP of the terminal device is switched from the BWP 3 to a BWP 4, and the terminal device attempts to perform random access on the BWP 4, and succeeds in performing random access on the BWP 4. It is assumed that the terminal device performs random access on the BWP 2 by using a CSI-RS 1 and a CSI-RS 2, the terminal device performs random access on the BWP 3 by using the CSI-RS 1, and the terminal device fails to perform random access on the BWP 4 by using the CSI-RS 1, but succeeds in performing random access on the BWP 4 by using the CSI-RS 2. In this case, the identification information of the CSI-RS attempted by the terminal device on the corresponding BWP includes identification information of the BWP 2: identification information of the CSI-RS 1 and identification information of the CSI-RS 2; identification information of the BWP 3: the identification information of the CSI-RS 1; and identification information of the BWP 4: the identification information of the CSI-RS 1. It should be noted that a number of the identification information of the CSI-RS is independently numbered for each BWP, and there is the CSI-RS 1 on all BWPs. The network device can distinguish, only based on the reported identification information of the BWP, a specific BWP corresponding to one CSI-RS 1. This is uniformly described herein, and details are not described below again.

Optionally, in this embodiment of this application, the network device may optimize, based on identification information of an SSB and/or a CSI-RS attempted by the terminal device on a BWP, a threshold that is selected by the SSB or the CSI-RS and that is in the random access configuration. Alternatively, the network device may determine, based on identification information of an SSB and/or a CSI-RS attempted on a BWP, whether to configure a random access resource on the BWP. This is not specifically limited in this embodiment of this application.

b. Frequency Information of the SSB and/or the CSI-RS Attempted by the Terminal Device on the Corresponding BWP For related descriptions of the SSB or the CSI-RS attempted by the terminal device on the corresponding BWP, refer to the foregoing descriptions. Details are not described herein again.

There may be one or more pieces of frequency information of an SSB and/or a CSI-RS attempted by the terminal device on a BWP. This is not specifically limited in this embodiment of this application.

For example, it is assumed that a currently active BWP is a BWP 1, uplink transmission can be performed only on the active BWP, and the terminal device determines that the consistent uplink LBT failure occurs on the BWP 1. In the consistent uplink LBT failure recovery, the active BWP of the terminal device is switched from the BWP 1 to a BWP 2, and the terminal device attempts to perform random access on the BWP 2, but fails to perform random access on the BWP 2. The active BWP of the terminal device is switched from the BWP 2 to a BWP 3, and the terminal device attempts to perform random access on the BWP 3, but fails to perform random access on the BWP 3. The active BWP of the terminal device is switched from the BWP 3 to a BWP 4, and the terminal device attempts to perform random access on the BWP 4, and succeeds in performing random access on the BWP 4. It is assumed that the terminal device performs random access on the BWP 2 by using an SSB 1 and an SSB 2, frequency information of the SSB 1 is a frequency 1, and frequency information of the SSB 2 is a frequency 2. The terminal device performs random access on the BWP 3 by using the SSB 1, and the frequency information of the SSB 1 is a frequency 3. The terminal device fails to perform random access on the BWP 4 by using the SSB 1, but succeeds in performing random access on the BWP 4 by using the SSB 2, the frequency information of the SSB 1 is a frequency 4, and the frequency information of the SSB 2 is a frequency 5. In this case, the frequency information of the SSB attempted by the terminal device on the corresponding BWP includes: identification information of the BWP 2: the frequency information of the SSB 1 (frequency 1) and the frequency information of the SSB 2 (frequency 2); identification information of the BWP 3: the frequency information of the SSB 1 (frequency 3); and identification information of the BWP 4: the frequency information of the SSB 1 (frequency 4). It should be noted that a number of the identification information of the SSB is independently numbered for each BWP, and there is the SSB 1 on all BWPs. The network device can distinguish, only based on the reported identification information of the BWP, a specific BWP corresponding to one SSB 1. This is uniformly described herein, and details are not described below again.

Alternatively, for example, it is assumed that a currently active BWP is a BWP 1, uplink transmission can be performed only on the active BWP, and the terminal device determines that the consistent uplink LBT failure occurs on the BWP 1. In the consistent uplink LBT failure recovery, the active BWP of the terminal device is switched from the BWP 1 to a BWP 2, and the terminal device attempts to perform random access on the BWP 2, but fails to perform random access on the BWP 2. The active BWP of the terminal device is switched from the BWP 2 to a BWP 3, and the terminal device attempts to perform random access on the BWP 3, but fails to perform random access on the BWP 3. The active BWP of the terminal device is switched from the BWP 3 to a BWP 4, and the terminal device attempts to perform random access on the BWP 4, and succeeds in performing random access on the BWP 4. It is assumed that the terminal device performs random access on the BWP 2 by using a CSI-RS 1 and a CSI-RS 2, frequency information of the CSI-RS 1 is a frequency 1, and frequency information of the CSI-RS 2 is a frequency 2. The terminal device performs random access on the BWP 3 by using the CSI-RS 1, and the frequency information of the CSI-RS 1 is a frequency 3. The terminal device fails to perform random access on the BWP 4 by using the CSI-RS 1, but succeeds in performing random access on the BWP 4 by using the CSI-RS 2, the frequency information of the CSI-RS 1 is a frequency 4, and the frequency information of the CSI-RS 2 is a frequency 5. In this case, the frequency information of the CSI-RS attempted by the terminal device on the corresponding BWP includes: identification information of the BWP 2: the frequency information of the CSI-RS 1 (frequency 1) and the frequency information of the CSI-RS 2 (frequency 2); identification information of the BWP 3: the frequency information of the CSI-RS 1 (frequency 3); and identification information of the BWP 4: the frequency information of the CSI-RS 1 (frequency 4). It should be noted that a number of the identification information of the CSI-RS is independently numbered for each BWP, and there is the CSI-RS 1 on all BWPs. The network device can distinguish, only based on the reported identification information of the BWP, a specific BWP corresponding to one CSI-RS 1. This is uniformly described herein, and details are not described below again.

Optionally, in this embodiment of this application, the network device may optimize, based on frequency information of an SSB and/or a CSI-RS attempted by the terminal device on a BWP, a threshold that is selected by the SSB or the CSI-RS and that is in the random access configuration. Alternatively, the network device may determine, based on frequency information of an SSB and/or a CSI-RS attempted by the terminal device on a BWP, whether to configure a random access resource on the BWP. This is not specifically limited in this embodiment of this application.

c. Quantity of Preambles Attempted by the Terminal Device on the Corresponding BWP In this embodiment of this application, the preamble attempted by the terminal device on the corresponding BWP is a preamble used by the terminal device to perform random access on the corresponding BWP before the consistent uplink LBT failure recovery is completed.

There may be one or more preambles attempted by the terminal device on a BWP. This is not specifically limited in this embodiment of this application.

It is assumed that a currently active BWP is a BWP 1, uplink transmission can be performed only on the active BWP, and the terminal device determines that the consistent uplink LBT failure occurs on the BWP 1. In the consistent uplink LBT failure recovery, the active BWP of the terminal device is switched from the BWP 1 to a BWP 2, and the terminal device attempts to perform random access on the BWP 2, but fails to perform random access on the BWP 2. The active BWP of the terminal device is switched from the BWP 2 to a BWP 3, and the terminal device attempts to perform random access on the BWP 3, but fails to perform random access on the BWP 3. The active BWP of the terminal device is switched from the BWP 3 to a BWP 4, and the terminal device attempts to perform random access on the BWP 4, and succeeds in performing random access on the BWP 4. It is assumed that the terminal device performs random access on the BWP 2 by using a preamble 1 and a preamble 2, the terminal device performs random access on the BWP 3 by using a preamble 3, and the terminal device fails to perform random access on the BWP 4 by using a preamble 4, but succeeds in performing random access on the BWP 4 by using a preamble 5. In this case, the quantity of preambles attempted by the terminal device on the corresponding BWP includes: identification information of the BWP 2: 2; identification information of the BWP 3: 1; and identification information of the BWP 4: 1. It should be noted that, in this embodiment of this application, when the terminal device performs random access on the BWP by using the preamble, the 2-step random access process or the 4-step random access process may be used. This is not specifically limited in this embodiment of this application. In addition, preambles used by the terminal device on the BWP may be associated with different SSBs or CSI-RSs. For example, the preamble 1 used by the terminal device on the BWP 2 may be associated with an SSB 1 or a CSI-RS 1, and the preamble 2 used by the terminal device on the BWP 2 may be associated with an SSB 2 or a CSI-RS 2. This is not specifically limited in this embodiment of this application.

Optionally, in this embodiment of this application, the network device may optimize, based on a quantity of preambles attempted by the terminal device on a BWP, a resource configuration in the random access configuration. Alternatively, the network device may determine, based on a quantity of preambles attempted by the terminal device on a BWP, whether to configure a random access resource on the BWP. This is not specifically limited in this embodiment of this application.

d. Quantity of Preambles for the SSB and/or the CSI-RS Attempted by the Terminal Device on the Corresponding BWP For related descriptions of the SSB or the CSI-RS attempted by the terminal device on the corresponding BWP, refer to the foregoing descriptions. Details are not described herein again.

Refer to the foregoing example of the quantity of preambles attempted by the terminal device on the corresponding BWP. Assuming that the preamble 1 used by the terminal device on the BWP 2 may be associated with the SSB 1, and the preamble 2 used by the terminal device on the BWP 2 may be associated with the SSB 2, a quantity of preambles for the SSB 1 attempted by the terminal device on the BWP 1 is 1, and a quantity of preambles for the SSB 2 attempted by the terminal device on the BWP 1 is 1. Alternatively, assuming that the preamble 1 used by the terminal device on the BWP 2 may be associated with the CSI-RS 1, and the preamble 2 used by the terminal device on the BWP 2 may be associated with the CSI-RS 2, a quantity of preambles for the CSI-RS 1 attempted by the terminal device on the BWP 1 is 1, and a quantity of preambles for the CSI-RS 2 attempted by the terminal device on the BWP 1 is 1.

Optionally, in this embodiment of this application, the network device may optimize, based on a quantity of preambles for an SSB and/or a CSI-RS attempted by the terminal device on a BWP, a resource configuration in the random access configuration. Alternatively, the network device may determine, based on a quantity of preambles for an SSB and/or a CSI-RS attempted by the terminal device on a BWP, whether to configure a random access resource on the BWP.

This is not specifically limited in this embodiment of this application.

e. Signal Quality of the SSB and/or the CSI-RS Attempted by the Terminal Device on the Corresponding BWP For related descriptions of the SSB or the CSI-RS attempted by the terminal device on the corresponding BWP, refer to the foregoing descriptions. Details are not described herein again. In addition, the signal quality in this embodiment of this application may include, for example, reference signal received power (reference signal received power, RSRP) or reference signal received quality (reference signal received quality, RSRQ). This is not specifically limited in this embodiment of this application.

For example, it is assumed that a currently active BWP is a BWP 1, uplink transmission can be performed only on the active BWP, and the terminal device determines that the consistent uplink LBT failure occurs on the BWP 1. In the consistent uplink LBT failure recovery, the active BWP of the terminal device is switched from the BWP 1 to a BWP 2, and the terminal device attempts to perform random access on the BWP 2, but fails to perform random access on the BWP 2. The active BWP of the terminal device is switched from the BWP 2 to a BWP 3, and the terminal device attempts to perform random access on the BWP 3, but fails to perform random access on the BWP 3. The active BWP of the terminal device is switched from the BWP 3 to a BWP 4, and the terminal device attempts to perform random access on the BWP 4, and succeeds in performing random access on the BWP 4. It is assumed that the terminal device performs random access on the BWP 2 by using an SSB 1 and an SSB 2, signal quality of the SSB 1 is RSRP 1, and signal quality of the SSB 2 is RSRP 2. The terminal device performs random access on the BWP 3 by using the SSB 1, and the signal quality of the SSB 1 is RSRP 3. The terminal device fails to perform random access on the BWP 4 by using the SSB 1, but succeeds in performing random access on the BWP 4 by using the SSB 2, the signal quality of the SSB 1 is RSRP 4, and the signal quality of the SSB 2 is RSRP 5. In this case, the signal quality of the SSB attempted by the terminal device on the corresponding BWP includes: identification information of the BWP 2: the identification information of the SSB 1 (RSRP 1) and the identification information of the SSB 2 (RSRP 2); identification information of the BWP 3: the identification information of the SSB 1 (RSRP 3); and identification information of the BWP 4: the identification information of the SSB 1 (RSRP 4). It should be noted that a number of the identification information of the SSB is independently numbered for each BWP, and there is the SSB 1 on all BWPs. The network device can distinguish, only based on the reported identification information of the BWP, a specific BWP corresponding to one SSB 1. This is uniformly described herein, and details are not described below again.

For example, it is assumed that a currently active BWP is a BWP 1, uplink transmission can be performed only on the active BWP, and the terminal device determines that the consistent uplink LBT failure occurs on the BWP 1. In the consistent uplink LBT failure recovery, the active BWP of the terminal device is switched from the BWP 1 to a BWP 2, and the terminal device attempts to perform random access on the BWP 2, but fails to perform random access on the BWP 2. The active BWP of the terminal device is switched from the BWP 2 to a BWP 3, and the terminal device attempts to perform random access on the BWP 3, but fails to perform random access on the BWP 3. The active BWP of the terminal device is switched from the BWP 3 to a BWP 4, and the terminal device attempts to perform random access on the BWP 4, and succeeds in performing random access on the BWP 4. It is assumed that the terminal device performs random access on the BWP 2 by using a CSI-RS 1 and a CSI-RS 2, signal quality of the CSI-RS 1 is RSRP 1, and signal quality of the CSI-RS 2 is RSRP 2. The terminal device performs random access on the BWP 3 by using the CSI-RS 1, and the signal quality of the CSI-RS 1 is RSRP 3. The terminal device fails to perform random access on the BWP 4 by using the CSI-RS 1, but succeeds in performing random access on the BWP 4 by using the CSI-RS 2, the signal quality of the CSI-RS 1 is RSRP 4, and the signal quality of the CSI-RS 2 is RSRP 5. In this case, the signal quality of the CSI-RS attempted by the terminal device on the corresponding BWP includes: identification information of the BWP 2: the signal quality of the CSI-RS 1 (RSRP 1) and the signal quality of the CSI-RS 2 (RSRP 2); identification information of the BWP 3: the signal quality of the CSI-RS 1 (RSRP 3); and identification information of the BWP 4: the signal quality of the CSI-RS 1 (RSRP 4). It should be noted that a number of the identification information of the CSI-RS is independently numbered for each BWP, and there is the CSI-RS 1 on all BWPs. The network device can distinguish, only based on the reported identification information of the BWP, a specific BWP corresponding to one CSI-RS 1. This is uniformly described herein, and details are not described below again.

Optionally, in this embodiment of this application, the network device may optimize, based on signal quality of an SSB and/or a CSI-RS attempted by the terminal device on a BWP, a threshold that is selected by the SSB or the CSI-RS and that is in the random access configuration. Alternatively, the network device may determine, based on signal quality of an SSB and/or a CSI-RS attempted by the terminal device on a BWP, whether to configure a random access resource on the BWP. This is not specifically limited in this embodiment of this application.

f. Information Indicating Whether Contention for Preambles in the 2-Step Random Access or the 4-Step Random Access Exists on the Corresponding BWP For example, it is assumed that a currently active BWP is a BWP 1, uplink transmission can be performed only on the active BWP, and the terminal device determines that the consistent uplink LBT failure occurs on the BWP 1. In the consistent uplink LBT failure recovery, the active BWP of the terminal device is switched from the BWP 1 to a BWP 2, and the terminal device attempts to perform random access on the BWP 2, but fails to perform random access on the BWP 2. The active BWP of the terminal device is switched from the BWP 2 to a BWP 3, and the terminal device attempts to perform random access on the BWP 3, but fails to perform random access on the BWP 3. The active BWP of the terminal device is switched from the BWP 3 to a BWP 4, and the terminal device attempts to perform random access on the BWP 4, and succeeds in performing random access on the BWP 4. It is assumed that the terminal device performs random access on the BWP 2 twice, one time of random access is the 2-step random access, and the other time of random access is the 4-step random access. A 2-step random access failure may be caused by the contention for the preambles in the 2-step random access, and a 4-step random access failure is not caused by the contention for the preambles in the 4-step random access. In this case, it may be learned that the contention for the preambles in the 2-step random access exists on the BWP 2, and the contention for the preambles in the 4-step random access does not exist on the BWP 2.

Optionally, in this embodiment of this application, the network device may optimize, based on information indicating whether the contention for the preambles in the 2-step random access or the 4-step random access exists on a BWP, a resource configuration in the random access configuration. Alternatively, the network device may determine, based on information indicating whether the contention for the preambles in the 2-step random access or the 4-step random access exists on a BWP, whether to configure a random access resource on the BWP. This is not specifically limited in this embodiment of this application.

g. Quantity of Preambles that are Used in the 2-Step Random Access and that are Attempted by the Terminal Device on the Corresponding BWP For related descriptions of the quantity of preambles that are used in the 2-step random access and that are attempted by the terminal device on the corresponding BWP, refer to the foregoing descriptions of the quantity of preambles attempted by the terminal device on the corresponding BWP. For example, a difference lies in that the preambles attempted by the terminal device on the corresponding BWP may be used in the 2-step random access or the 4-step random access. Herein, only the quantity of preambles that are used in the 2-step random access and that are attempted by the terminal device on the corresponding BWP needs to be counted, and details are not described herein again.

Optionally, in this embodiment of this application, the network device may optimize, based on a quantity of preambles that are used in the 2-step random access and that are attempted by the terminal device on a BWP, a resource configuration in the random access configuration. Alternatively, the network device may determine, based on a quantity of preambles that are used in the 2-step random access and that are attempted by the terminal device on a BWP, whether to configure a random access resource on the BWP. This is not specifically limited in this embodiment of this application.

h. Quantity of Preambles that are Used in the 4-Step Random Access and that are Attempted by the Terminal Device on the Corresponding BWP For related descriptions of the quantity of preambles that are used in the 4-step random access and that are attempted by the terminal device on the corresponding BWP, refer to the foregoing descriptions of the quantity of preambles attempted by the terminal device on the corresponding BWP. For example, a difference lies in that the preambles attempted by the terminal device on the corresponding BWP may be used in the 2-step random access or the 4-step random access. Herein, only the quantity of preambles that are used in the 4-step random access and that are attempted by the terminal device on the corresponding BWP needs to be counted, and details are not described herein again.

Optionally, in this embodiment of this application, the network device may optimize, based on a quantity of preambles that are used in the 4-step random access and that are attempted by the terminal device on a BWP, a resource configuration in the random access configuration. Alternatively, the network device may determine, based on a quantity of preambles that are used in the 4-step random access and that are attempted by the terminal device on a BWP, whether to configure a random access resource on the BWP. This is not specifically limited in this embodiment of this application.

i. Information Indicating Whether Fallback from the 2-Step Random Access to the 4-Step Random Access Occurs on the Corresponding BWP For example, assuming that on a BWP, the quantity of preambles in the 2-step random access reaches a maximum preset quantity, and random access fails, the terminal device performs 4-step random access by using a 4-step random access configuration. In this case, it may be considered that the fallback from the 2-step random access to the 4-step random access occurs on the BWP.

Optionally, in this embodiment of this application, the network device may optimize, based on information indicating whether the fallback from the 2-step random access to the 4-step random access occurs on a BWP, a resource configuration in the random access configuration. Alternatively, the network device may determine, based on information indicating whether the fallback from the 2-step random access to the 4-step random access occurs on a BWP, whether to configure a random access resource on the BWP. This is not specifically limited in this embodiment of this application.

In this embodiment of this application, the terminal device may report, to the network device, the information about the random access failure that occurs when the terminal device performs random access, so that the network device can update the one or more of the random access configuration, the uplink LBT failure configuration, or the BWP configuration based on the information about the random access failure that occurs when the terminal device performs random access. Therefore, the random access configuration, the uplink LBT failure configuration, or the BWP configuration can be optimized. Optimizing the random access configuration or the BWP configuration can reduce a latency in the consistent UL LBT failure recovery. Optimizing the uplink LBT failure configuration can postpone an occurrence of the consistent UL LBT failure or avoid the occurrence of the consistent UL LBT failure. Data transmission efficiency can be improved by reducing the latency in the consistent UL LBT failure recovery, postponing the occurrence of the consistent UL LBT failure, or avoiding the occurrence of the consistent UL LBT failure. Therefore, based on the communication method provided in this embodiment of this application, the data transmission efficiency can be improved.

Actions of the network device in steps S601 to S603 may be performed by the processor 401 in the network device 40 shown in FIG. 4 by invoking application program code stored in the memory 402. Actions of the terminal device in steps S601 to S603 may be performed by the processor 501 in the terminal device 50 shown in FIG. 4 by invoking application program code stored in the memory 502.

It may be understood that, in the foregoing embodiments, methods and/or steps implemented by the network device may also be implemented by a component (for example, a chip or a circuit) that can be used in the network device, and methods and/or steps implemented by the terminal device may also be implemented by a component (for example, a chip or a circuit) that can be used in the terminal device.

The foregoing mainly describes the solutions provided in embodiments of this application from the perspective of interaction between network elements. Correspondingly, an embodiment of this application further provides a communication apparatus, and the communication apparatus is configured to implement the foregoing method. The communication apparatus may be the terminal device in the foregoing method embodiment, an apparatus including the foregoing terminal device, or a component that can be used in the terminal device. Alternatively, the communication apparatus may be the network device in the foregoing method embodiment, an apparatus including the foregoing network device, or a component that can be used in the network device. It may be understood that, to implement the foregoing functions, the communication apparatus includes corresponding hardware structures and/or software modules for performing the functions. A person skilled in the art should easily be aware that, in combination with the units and algorithm steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, and is merely logical function division. During actual implementation, another division manner may be used.

Figure 7:
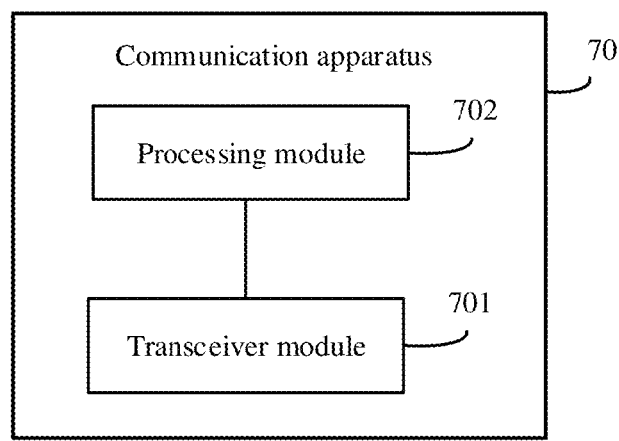
FIG. 7 is a schematic diagram of a structure of a communication apparatus according to an embodiment of this application.

FIG. 7 is a schematic diagram of a structure of a communication apparatus 70. The communication apparatus 70 includes a transceiver module 701 and a processing module 702. The transceiver module 701 may also be referred to as a transceiver unit, and is configured to implement a transceiver function. For example, the transceiver module 701 may be a transceiver circuit, a transceiver, or a communication interface.

For example, the communication apparatus 70 is the network device in the foregoing method embodiment. The processing module 702 is configured to obtain first information, where the first information is information about a random access failure that occurs when a terminal device performs random access. The transceiver module 701 is configured to send the first information to the network device, where the first information is used to update one or more of the following: a random access configuration, an uplink LBT failure configuration, or a BWP configuration.

Alternatively, for example, the communication apparatus 70 is the network device in the foregoing method embodiment. The transceiver module 701 is configured to receive first information from a terminal device, where the first information is information about a random access failure that occurs when the terminal device performs random access. The processing module 702 is configured to update one or more of the following based on the first information: a random access configuration, an uplink LBT failure configuration, or a BWP configuration.

All related content of the steps in the foregoing method embodiments may be cited in function descriptions of corresponding functional modules. Details are not described herein again.

In this embodiment, the communication apparatus 70 is presented in a form of functional modules obtained through integration. The "module" herein may be a specific ASIC, a circuit, a processor that executes one or more software or firmware programs, a memory, an integrated logic circuit, and/or another component that can provide the foregoing functions.

For example, the communication apparatus 70 is the terminal device in the foregoing method embodiment. In a simple embodiment, a person skilled in the art may figure out that the communication apparatus 70 may be in a form of the terminal device 50 shown in FIG. 4. For example, the processor 501 in the terminal device 50 shown in FIG. 4 may invoke the computer-executable instructions stored in the memory 502, to enable the terminal device 50 to perform the communication method in the foregoing method embodiment. Specifically, functions/implementation processes of the transceiver module 701 and the processing module 702 in FIG. 7 may be implemented by the processor 501 in the terminal device 50 shown in FIG. 4 by invoking the computer-executable instructions stored in the memory 502. Alternatively, functions/implementation processes of the processing module 702 in FIG. 7 may be implemented by the processor 501 in the terminal device 50 shown in FIG. 4 by invoking the computer-executable instructions stored in the memory 502. Functions/implementation processes of the transceiver module 701 in FIG. 7 may be implemented by using the transceiver 503 in the terminal device 50 shown in FIG. 4.

For example, the communication apparatus 70 is the network device in the foregoing method embodiment. In a simple embodiment, a person skilled in the art may figure out that the communication apparatus 70 may be in a form of the network device 40 shown in FIG. 4. For example, the processor 401 in the network device 40 shown in FIG. 4 may invoke the computer-executable instructions stored in the memory 402, to enable the network device 40 to perform the communication method in the foregoing method embodiment. Specifically, functions/implementation processes of the transceiver module 701 and the processing module 702 in FIG. 7 may be implemented by the processor 401 in the network device 40 shown in FIG. 4 by invoking the computer-executable instructions stored in the memory 402. Alternatively, functions/implementation processes of the processing module 702 in FIG. 7 may be implemented by the processor 401 in the network device 40 shown in FIG. 4 by invoking the computer-executable instructions stored in the memory 402. Functions/implementation processes of the transceiver module 701 in FIG. 7 may be implemented by using the transceiver 403 in the network device 40 shown in FIG. 4.

The communication apparatus 70 provided in this embodiment may perform the communication method in the foregoing method embodiment. Therefore, for technical effects that can be achieved by the communication apparatus 70, refer to the foregoing method embodiment. Details are not described herein again.

It should be noted that one or more of the foregoing modules or units may be implemented by using software, hardware, or a combination thereof. When any one of the foregoing modules or units is implemented by software, the software exists in a form of computer program instructions, and is stored in the memory. The processor may be configured to execute the program instructions and implement the foregoing method procedure. The processor may be built into a SoC (system-on-a-chip) or an ASIC, or may be an independent semiconductor chip. The processor includes a core for executing software instructions to perform operations or processing, and may further include a necessary hardware accelerator, for example, a field programmable gate array (field programmable gate array, FPGA), a PLD (programmable logic device), or a logic circuit that implements a special-purpose logic operation.

When the foregoing modules or units are implemented by using hardware, the hardware may be any one or any combination of a CPU, a microprocessor, a digital signal processing (digital signal processing, DSP) chip, a microcontroller unit (microcontroller unit, MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. When the communication apparatus is a chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. In this way, this application is intended to cover these modifications and variations of this application provided that they fall within the scope of the claims of this application and their equivalent technologies.

What is claimed is:

1. A communication method, wherein the method comprises:
    obtaining first information, wherein the first information includes information of a random access failure that occurs in response to a terminal device performing random access; and
    sending the first information to a network device, wherein the first information is useable to update at least one or more of:
        a random access configuration,
        an uplink listen before talk (LBT) failure configuration, or
        a bandwidth part (BWP) configuration;
    wherein the first information comprises a BWP switching quantity information, and the BWP switching quantity information indicates a quantity of times of BWP switching that has been performed by the terminal device before a consistent uplink LBT failure recovery is completed.

2. The method according to claim 1 wherein the first information further comprises one or more of:
    identification information of at least one BWP, or
    random access statistics information of the at least one BWP, wherein
    the identification information of the at least one BWP indicates a BWP on which the terminal device has performed the consistent uplink LBT failure recovery before the consistent uplink LBT failure recovery is completed; and
    the random access statistics information of the at least one BWP indicates random access statistics information of the BWP on which the terminal device has performed the consistent uplink LBT failure recovery before the consistent uplink LBT failure recovery is completed.

3. The method according to claim 2, wherein the random access statistics information of each of the at least one BWP comprises one or more of:
    identification information of a synchronization signal block (SSB) or a channel state information-reference signal (CSI-RS) attempted by the terminal device on a corresponding BWP,
    frequency information of the SSB or the CSI-RS attempted by the terminal device on the corresponding BWP,
    a quantity of preambles attempted by the terminal device on the corresponding BWP,
    a quantity of preambles for the SSB or the CSI-RS attempted by the terminal device on the corresponding BWP,
    a signal quality of the SSB or the CSI-RS attempted by the terminal device on the corresponding BWP,
    information indicating whether contention for preambles in a 2-step random access or a 4-step random access exists on the corresponding BWP,
    a quantity of preambles in the 2-step random access and that are attempted by the terminal device on the corresponding BWP,
    a quantity of preambles in the 4-step random access and that are attempted by the terminal device on the corresponding BWP, or
    information indicating whether fallback from the 2-step random access to the 4-step random access occurs on the corresponding BWP.

4. The method according to claim 1, wherein the random access configuration comprises one or more of:
    a physical random access channel (PRACH) configuration of a preamble in a 2-step random access,
    a time-frequency resource configuration of a payload in the 2-step random access,
    indication information indicating whether fallback from the 2-step random access to a 4-step random access is allowed,
    a PRACH configuration of a preamble in the 4-step random access,
    grouping of preambles in the 2-step random access,
    grouping of preambles in the 4-step random access,
    a backoff parameter value in the 2-step random access,
    a backoff parameter value in the 4-step random access,
    a transmit power control parameter in the 2-step random access, or
    a transmit power control parameter in the 4-step random access.

5. The method according to claim 4, wherein the PRACH configuration comprises one or more of:
    a root sequence index,
    a zero correlation zone configuration,
    a high speed flag,
    a frequency offset,
    a configuration index, or a correspondence between a synchronization signal block (SSB) or a channel state information-reference signal (CSI-RS) and a random access resource, wherein the root sequence index is usable to configure a logical sequence number of a start root sequence of root sequences usable by a cell, the SSB, or the CSI-RS;

the zero correlation zone configuration indicates an index value of a cyclic shift configuration usable in response to a PRACH preamble being generated;

the high speed flag is usable to determine whether the cell is a high-speed cell, whether the SSB is a high-speed SSB, or whether the CSI-RS is a high-speed CSI-RS;

the frequency offset indicates an index of a first resource block (RB) usable by the terminal device to send a preamble;

the configuration index indicates a time domain resource and a preamble format usable by the terminal device to send the preamble;

the correspondence between the SSB and the random access resource indicates a quantity of SSBs corresponding to one random access resource; and the correspondence between the CSI-RS and the random access resource indicates a quantity of CSI-RSs corresponding to the one random access resource.

6. The method according to claim 1, wherein the BWP configuration comprises:
information indicating whether a random access resource is configured for the terminal device on a BWP.

7. The method according to claim 1, wherein the uplink LBT failure configuration comprises one or more of:
an uplink LBT failure timer, an uplink LBT failure counter, or an energy detection threshold.

8. A communication apparatus, comprising:
a processor; and
a transceiver;
wherein the processor is configured to obtain first information, wherein the first information includes information of a random access failure that occurs in response to a terminal device performing random access; and
the transceiver is configured to send the first information to a network device, wherein the first information is useable to update one or more of:
a random access configuration,
an uplink listen before talk (LBT) failure configuration, or
a bandwidth part (BWP) configuration;
wherein the first information comprises a BWP switching quantity information, and the BWP switching quantity information indicates a quantity of times of BWP switching that has been performed by the terminal device before a consistent uplink LBT failure recovery is completed.

9. The communication apparatus according to claim 8, wherein the first information further comprises one or more of:
identification information of at least one BWP, or
random access statistics information of the at least one BWP,
wherein
the identification information of the at least one BWP indicates a BWP on which the terminal device has performed the consistent uplink LBT failure recovery before the consistent uplink LBT failure recovery is completed; and
the random access statistics information of the at least one BWP indicates random access statistics information of the BWP on which the terminal device has performed the consistent uplink LBT failure recovery before the consistent uplink LBT failure recovery is completed.

10. The communication apparatus according to claim 9, wherein the random access statistics information of each of the at least one BWP comprises one or more of:
identification information of a synchronization signal block (SSB) or a channel state information-reference signal (CSI-RS) attempted by the terminal device on a corresponding BWP,
frequency information of the SSB or the CSI-RS attempted by the terminal device on the corresponding BWP,
a quantity of preambles attempted by the terminal device on the corresponding BWP,
a quantity of preambles for the SSB or the CSI-RS attempted by the terminal device on the corresponding BWP,
a signal quality of the SSB or the CSI-RS attempted by the terminal device on the corresponding BWP,
information indicating whether contention for preambles in a 2-step random access or a 4-step random access exists on the corresponding BWP,
a quantity of preambles in the 2-step random access and that are attempted by the terminal device on the corresponding BWP,
a quantity of preambles in the 4-step random access and that are attempted by the terminal device on the corresponding BWP, or
information indicating whether fallback from the 2-step random access to the 4-step random access occurs on the corresponding BWP.

11. The communication apparatus according to claim 8, wherein the random access configuration comprises one or more of:
a physical random access channel (PRACH) configuration of a preamble in a 2-step random access,
a time-frequency resource configuration of a payload in the 2-step random access,
indication information indicating whether fallback from the 2-step random access to a 4-step random access is allowed,
a PRACH configuration of a preamble in the 4-step random access,
grouping of preambles in the 2-step random access,
grouping of preambles in the 4-step random access,
a backoff parameter value in the 2-step random access,
a backoff parameter value in the 4-step random access,
a transmit power control parameter in the 2-step random access, or
a transmit power control parameter in the 4-step random access.

12. The communication apparatus according to claim 11, wherein the PRACH configuration comprises one or more of:
a root sequence index,
a zero correlation zone configuration,
a high speed flag,
a frequency offset,
a configuration index, or
a correspondence between a synchronization signal block (SSB) or a channel state information-reference signal (CSI-RS) and a random access resource,
wherein the root sequence index is usable to configure a logical sequence number of a start root sequence of root sequences usable by a cell, the SSB, or the CSI-RS;

the zero correlation zone configuration indicates an index value of a cyclic shift configuration usable in response to a PRACH preamble being generated;

the high speed flag is usable to determine whether the cell is a high-speed cell, whether the SSB is a high-speed SSB, or whether the CSI-RS is a high-speed CSI-RS;

the frequency offset indicates an index of a first resource block (RB) usable by the terminal device to send a preamble;

the configuration index indicates a time domain resource and a preamble format usable by the terminal device to send the preamble;

the correspondence between the SSB and the random access resource indicates a quantity of SSBs corresponding to one random access resource; and the correspondence between the CSI-RS and the random access resource indicates a quantity of CSI-RSs corresponding to the one random access resource.

13. The communication apparatus according to claim 8, wherein the BWP configuration comprises:
information indicating whether a random access resource is configured for the terminal device on a BWP.

14. The communication apparatus according to claim 8, wherein the uplink LBT failure configuration comprises one or more of:
an uplink LBT failure timer, an uplink LBT failure counter, or an energy detection threshold.

15. A non-transitory computer readable medium, wherein the non-transitory computer readable medium is configured to store non-transitory instructions, and in response to being executed by a processor, the non-transitory instructions cause the processor to perform operations comprising:
obtaining first information, wherein the first information includes information of a random access failure that occurs in response to a terminal device performing random access; and
sending the first information to a network device, wherein the first information is useable to update at least one or more of:
a random access configuration,
an uplink listen before talk (LBT) failure configuration, or
a bandwidth part (BWP) configuration;
wherein the first information comprises a BWP switching quantity information, and the BWP switching quantity information indicates a quantity of times of BWP switching that has been performed by the terminal device before a consistent uplink LBT failure recovery is completed.

16. The non-transitory computer readable medium according to claim 15, wherein the first information further comprises one or more of:
identification information of at least one BWP, or
random access statistics information of the at least one BWP,
wherein
the identification information of the at least one BWP indicates a BWP on which the terminal device has performed the consistent uplink LBT failure recovery before the consistent uplink LBT failure recovery is completed; and
the random access statistics information of the at least one BWP indicates random access statistics information of the BWP on which the terminal device has performed the consistent uplink LBT failure recovery before the consistent uplink LBT failure recovery is completed.

17. The non-transitory computer readable medium according to claim 16, wherein the random access statistics information of each of the at least one BWP comprises one or more of:
identification information of a synchronization signal block (SSB) or a channel state information-reference signal (CSI-RS) attempted by the terminal device on a corresponding BWP,
frequency information of the SSB or the CSI-RS attempted by the terminal device on the corresponding BWP,
a quantity of preambles attempted by the terminal device on the corresponding BWP,
a quantity of preambles for the SSB or the CSI-RS attempted by the terminal device on the corresponding BWP,
a signal quality of the SSB or the CSI-RS attempted by the terminal device on the corresponding BWP,
information indicating whether contention for preambles in a 2-step random access or a 4-step random access exists on the corresponding BWP,
a quantity of preambles in the 2-step random access and that are attempted by the terminal device on the corresponding BWP,
a quantity of preambles in the 4-step random access and that are attempted by the terminal device on the corresponding BWP, or
information indicating whether fallback from the 2-step random access to the 4-step random access occurs on the corresponding BWP.

18. The non-transitory computer readable medium according to claim 15, wherein the random access configuration comprises one or more of:
a physical random access channel (PRACH) configuration of a preamble in a 2-step random access,
a time-frequency resource configuration of a payload in the 2-step random access,
indication information indicating whether fallback from the 2-step random access to a 4-step random access is allowed,
a PRACH configuration of a preamble in the 4-step random access,
grouping of preambles in the 2-step random access,
grouping of preambles in the 4-step random access,
a backoff parameter value in the 2-step random access,
a backoff parameter value in the 4-step random access,
a transmit power control parameter in the 2-step random access, or
a transmit power control parameter in the 4-step random access.

19. The non-transitory computer readable medium according to claim 18, wherein the PRACH configuration comprises one or more of:
a root sequence index,
a zero correlation zone configuration,
a high speed flag,
a frequency offset,
a configuration index, or
a correspondence between a synchronization signal block (SSB) or a channel state information-reference signal (CSI-RS) and a random access resource,
wherein the root sequence index is usable to configure a logical sequence number of a start root sequence of root sequences usable by a cell, the SSB, or the CSI-RS;
the zero correlation zone configuration indicates an index value of a cyclic shift configuration usable in response to a PRACH preamble being generated;

the high speed flag is usable to determine whether the cell is a high-speed cell, whether the SSB is a high-speed SSB, or whether the CSI-RS is a high-speed CSI-RS;

the frequency offset indicates an index of a first resource block (RB) usable by the terminal device to send a preamble;

the configuration index indicates a time domain resource and a preamble format usable by the terminal device to send the preamble;

the correspondence between the SSB and the random access resource indicates a quantity of SSBs corresponding to one random access resource; and the correspondence between the CSI-RS and the random access resource indicates a quantity of CSI-RSs corresponding to the one random access resource.

20. The non-transitory computer readable medium according to claim 15, wherein the BWP configuration comprises:

information indicating whether a random access resource is configured for the terminal device on a BWP.

* * * * *